(12) United States Patent     (10) Patent No.:    US 7,630,686 B2
Fukutani et al.                  (45) Date of Patent:    Dec. 8, 2009

(54) RADIO-FREQUENCY-SIGNAL RECEIVER AND METHOD OF MANUFACTURING THE SAME

(75) Inventors: Junichi Fukutani, Aichi (JP); Toshihiro Furusawa, Gifu (JP); Motoyoshi Kitagawa, Gifu (JP); Masashi Yasuda, Aichi (JP)

(73) Assignee: Panasonic Corporation, Osaka (JP)

( * ) Notice: Subject to any disclaimer, the term of this patent is extended or adjusted under 35 U.S.C. 154(b) by 1607 days.

(21) Appl. No.: 10/477,815

(22) PCT Filed: Jan. 21, 2003

(86) PCT No.: PCT/JP03/00464

§ 371 (c)(1), (2), (4) Date: Nov. 13, 2003

(87) PCT Pub. No.: WO03/063437

PCT Pub. Date: Jul. 31, 2003

(65) Prior Publication Data

US 2004/0153879 A1     Aug. 5, 2004

(30) Foreign Application Priority Data

Jan. 22, 2002 (JP) .............................. 2002-012516
Dec. 4, 2002 (JP) .............................. 2002-352397

(51) Int. Cl.
*H04B 1/00* (2006.01)

(52) U.S. Cl. ............... 455/63.1; 455/191.1; 455/192.2; 455/192.3; 375/344; 375/345

(58) Field of Classification Search ............... 455/424, 455/425, 456.5, 456.6, 550.1, 575.1, 63.1, 455/67.13, 135, 136, 138, 164.1, 164.2, 165.1, 455/179.1, 180.2, 182.1, 182.2, 191.1, 192.2, 455/192.3, 193.1, 193.3, 194.2, 196.1, 197, 455/561, 226.2, 232.1–250.1, 13.1, 67.11; 348/452.2, 678, 725–738; 343/713, 750; 375/344, 339, 345

See application file for complete search history.

(56) References Cited

U.S. PATENT DOCUMENTS

| 4,455,681 A | * | 6/1984 | Wile ........................ 455/243.1 |
| 4,835,541 A | * | 5/1989 | Johnson et al. ............. 343/713 |
| 4,905,305 A | * | 2/1990 | Garner et al. ............ 455/183.2 |
| 5,003,307 A | * | 3/1991 | Whiting et al. ................ 341/51 |

(Continued)

FOREIGN PATENT DOCUMENTS

CN         1293493 A     5/2001

(Continued)

OTHER PUBLICATIONS

Japanese International Search Report for PCT/JP03/00464, dated Mar. 4, 2003.

*Primary Examiner*—Duc Nguyen
*Assistant Examiner*—Charles Chow
(74) *Attorney, Agent, or Firm*—RatnerPrestia

(57) ABSTRACT

A radio-frequency signal receiver and its manufacturing method are disclosed. A tuner receives a radio-frequency signal, and a demodulator receives an output signal from the tuner. An error corrector receives an output from the demodulator. A determiner determines whether or not an error rate supplied from the error corrector is not less than a predetermined rate. A controller receives an output from the determiner, and based on the determination, the controller controls a plurality of sections forming the radio-frequency signal receiver. The controller controls selectively one of the plurality of sections, thereby lowering the error rate. A manufacturing method of this receiver makes a memory, coupled to the controller, store a shift-amount of frequency corresponding to an interference signal in a pass-band of a narrow-band filter.

11 Claims, 18 Drawing Sheets

U.S. PATENT DOCUMENTS

| | | | | |
|---|---|---|---|---|
| 5,031,233 A * | 7/1991 | Ragan | ........................ | 455/307 |
| 5,170,497 A * | 12/1992 | Uchikura | .................. | 455/183.2 |
| 5,175,529 A * | 12/1992 | St. Clair | .................. | 340/425.5 |
| 5,175,883 A * | 12/1992 | Ueno | ....................... | 455/242.2 |
| 5,222,255 A * | 6/1993 | Kuo et al. | .................... | 455/266 |
| 5,257,409 A * | 10/1993 | Sarocka et al. | ................. | 455/76 |
| 5,465,408 A * | 11/1995 | Sugayama et al. | ........ | 455/249.1 |
| 5,475,871 A * | 12/1995 | Shalev et al. | .................. | 455/70 |
| 5,483,694 A * | 1/1996 | Bartels et al. | ................. | 455/295 |
| 5,499,396 A * | 3/1996 | Reime | ........................ | 455/266 |
| 5,507,023 A * | 4/1996 | Suganuma et al. | ........ | 455/234.1 |
| 5,715,529 A * | 2/1998 | Kianush et al. | ............. | 455/266 |
| 5,722,060 A * | 2/1998 | Horigome | ................. | 455/234.1 |
| 5,745,844 A * | 4/1998 | Kromer et al. | ........... | 455/193.1 |
| 5,781,851 A * | 7/1998 | Saito | ....................... | 455/182.1 |
| 5,872,540 A * | 2/1999 | Casabona et al. | ........... | 342/362 |
| 5,991,344 A * | 11/1999 | Fujii et al. | .................. | 375/344 |
| 6,122,496 A * | 9/2000 | Yoshioka | .................... | 455/307 |
| 6,236,842 B1 * | 5/2001 | Kobayashi | ............... | 455/249.1 |
| 6,631,265 B2 * | 10/2003 | Holden et al. | ............... | 455/439 |
| 6,650,878 B1 | 11/2003 | Abe et al. | | |
| 6,711,395 B1 * | 3/2004 | Tonegawa et al. | ........... | 455/313 |
| 6,718,167 B2 * | 4/2004 | Visee | ......................... | 455/339 |
| 6,725,463 B1 * | 4/2004 | Birleson | ..................... | 725/151 |
| 6,740,830 B2 * | 5/2004 | Sato et al. | .................... | 200/343 |
| 7,035,610 B2 * | 4/2006 | Tsushima | ................. | 455/240.1 |
| 7,217,852 B1 * | 5/2007 | DeHaan et al. | .............. | 585/734 |
| 7,239,358 B1 * | 7/2007 | Mayer | ........................ | 348/731 |
| 7,242,915 B2 * | 7/2007 | Shi | ......................... | 455/232.1 |
| 7,299,021 B2 * | 11/2007 | Parssinen et al. | ......... | 455/226.1 |
| 2002/0008787 A1 * | 1/2002 | Kurihara | ..................... | 348/731 |
| 2002/0122140 A1 * | 9/2002 | Cowley | ...................... | 348/731 |
| 2006/0164563 A1 * | 7/2006 | Watanabe et al. | ........... | 348/731 |

FOREIGN PATENT DOCUMENTS

| | | |
|---|---|---|
| JP | 59-002444 A | 1/1984 |
| JP | 01-129620 A | 5/1989 |
| JP | 06-069829 A | 3/1994 |
| JP | 06-505847 A | 6/1994 |
| JP | 08-110231 A | 4/1996 |
| JP | 08-265186 A | 10/1996 |
| JP | 10-013280 A | 1/1998 |
| JP | 2000-092021 A | 3/2000 |
| JP | 2000-312235 A | 11/2000 |
| JP | 2001-044873 A | 2/2001 |
| JP | 2001-069027 A | 3/2001 |
| JP | 2001-077713 A | 3/2001 |
| JP | 2001-102947 A | 4/2001 |
| JP | 2001-127732 A | 5/2001 |
| JP | 2001-274713 A | 10/2001 |

* cited by examiner

FIG. 17A
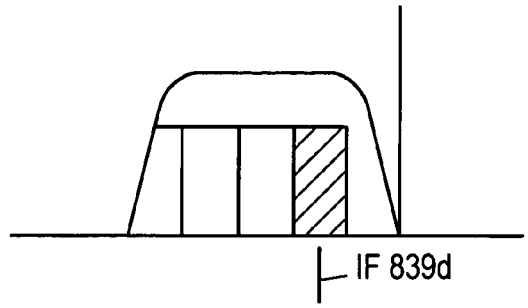
FIG. 17B
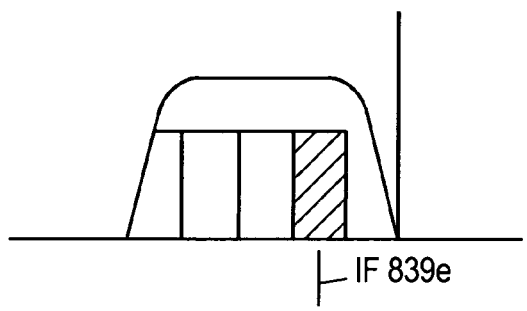
FIG. 17C
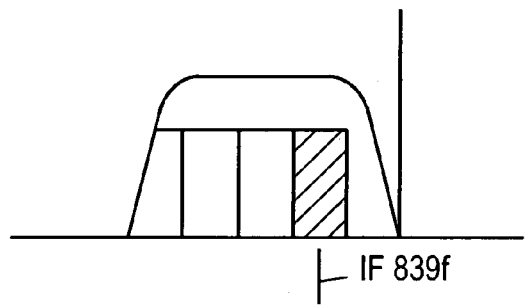
FIG. 18
| Δf2 | SW826a | SW826b | Δf3 |
|---|---|---|---|
| 0~100kHz | 0 | 0 | 50kHz |
| 100kHz~200kHz | 0 | 1 | 150kHz |
| 200kHz~300kHz | 1 | 0 | 250kHz |
| 300kHz~400kHz | 1 | 1 | 350kHz |

PRIOR ART

RADIO-FREQUENCY-SIGNAL RECEIVER AND METHOD OF MANUFACTURING THE SAME

This application is A U.S. National Phase Application of PCT International Application PCT/JP03/00464.

TECHNICAL FIELD

The present invention relates to a radio-frequency signal receiver for receiving radio-frequency signals including a television signal, and a method of manufacturing the receiver.

BACKGROUND ART

A conventional radio-frequency signal receiver is described hereinafter. FIG. 25 is a block diagram of the conventional radio-frequency signal receiver, which has the following construction:

Rod antenna 1 receives a radio frequency signal modulated by a digital signal. Tuner 2 receives the signal from antenna 1. Demodulator 3 receives an output from tuner 2. Viterbi corrector 4 receives an output from demodulator 3. Reed-Solomon corrector 5 receives an output from Viterbi corrector 4. Output terminal 6 receives an output from Reed-Solomon corrector 5. Determiner 7 also receives the output from Viterbi corrector 4. Controller 8 is interposed between determiner 7 and demodulator 3. Viterbi corrector 4 and Reed-Solomon corrector 5 are included in corrector 102. Controller 8 and determiner 7 are included in control block 104.

The foregoing radio-frequency signal receiver is, for instance, disclosed in Japanese Patent Application Non-examined Publication No. 2001-77713. In this conventional radio-frequency signal receiver, controller 8 controls only demodulator 3. Controller 8 thus cannot always improve a greater bit error rate. Being used in a mobile apparatus or a portable apparatus, this receiver cannot always deal with quickly and flexibly a change of radio-wave when the receiver is behind a building or when the receiver is on the move.

DISCLOSURE OF THE INVENTION

The present invention aims to provide a radio-frequency signal receiver for receiving radio-frequency signals such as broadcasting signals including digital-television signals with a small bit-error rate.

In this radio-frequency signal receiver of the present invention, a radio-frequency signal is fed into a tuner, which supplies an output signal to a demodulator. An error corrector receives an output signal from the demodulator. A determiner determines whether or not an error rate supplied from the error corrector is not less than a given rate. A controller controls a plurality of sections forming the receiver based on the determination, and controls some of the sections selectively, thereby lowering the error rate.

A method of manufacturing the foregoing receiver of the present invention makes a memory to store a change of a frequency, where the memory is incorporated in the controller. The change of a frequency deals with an interference signal of a frequency-band passing through a narrow-band filter. The present invention thus provides a radio-frequency signal receiver with a small bit-error rate.

BRIEF DESCRIPTION OF THE DRAWINGS

FIGS. 17A, 17B, and 17C show frequency characteristics when an intermediate frequency of a radio-frequency signal receiver shifts.

FIG. 18 shows a logic table of a controller.

PREFERRED EMBODIMENTS OF THE INVENTION

Exemplary Embodiment 1

Figure 1:
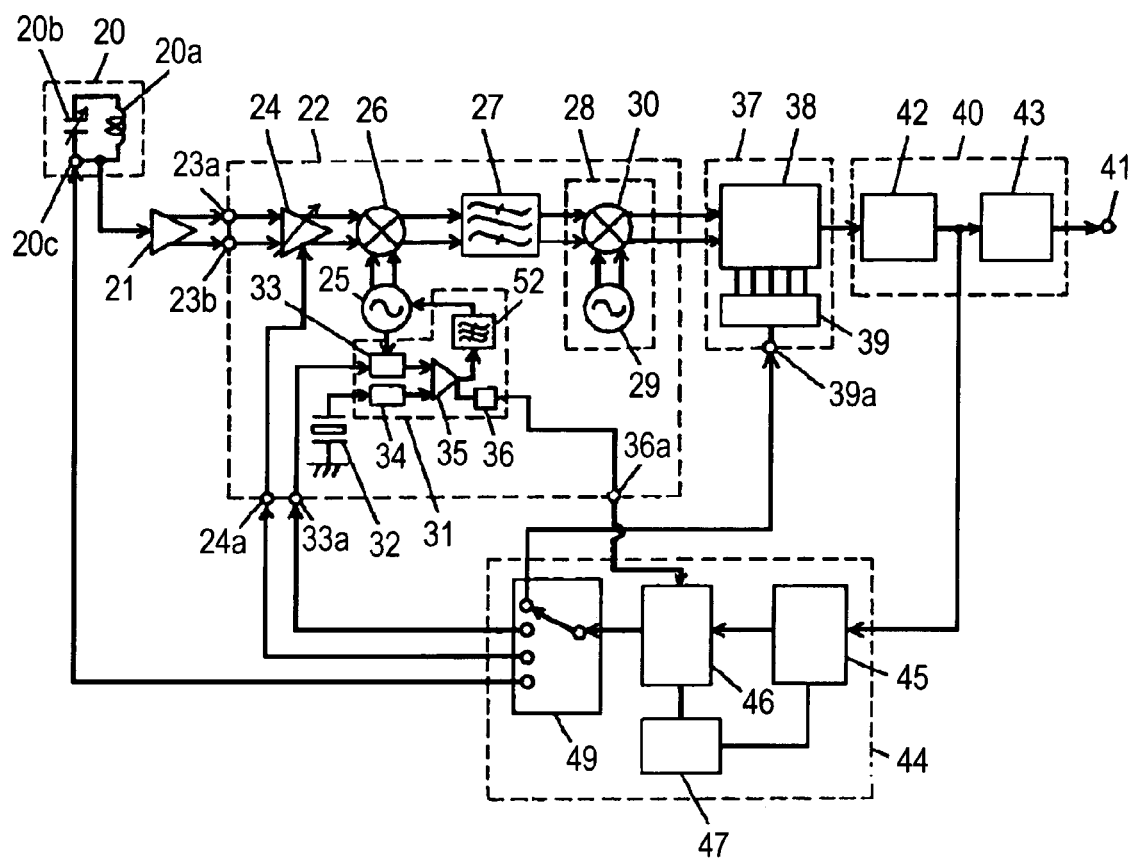
FIG. 1 is a block diagram of a radio-frequency signal receiver in accordance with a first exemplary embodiment of the present invention.

The first exemplary embodiment of the present invention is demonstrated hereinafter with an accompanying drawing. FIG. 1 is a circuit block diagram of a radio-frequency signal receiver in accordance with the first embodiment of present invention.

In FIG. 1, tuning antenna 20 includes an unbalanced input-tuning section which receives a radio-frequency signal modulated by a digital signal. This input tuning section includes inductor 20a and variable capacity diode 20b coupled in parallel to each other. Inductor 20a is formed of a conductive pattern on dielectric, and variable capacity diode 20b changes its capacity in response to a control voltage supplied to control terminal 20c. A tuned frequency of antenna 20 thus changes in response to the control voltage. An agreement between a frequency of a desired signal and the tuned frequency of antenna 20 prompts the input tuning section to pass the desired signal and suppresses noises other than the desired signal.

Tuning antenna 20 is desirably disposed at an upper section of an apparatus during the reception of signals, thereby increasing the receiving sensitivity.

Inductor 20a and variable capacity diode 20b forming the input tuning section are disposed closely to each other but not being affected by the noises from each other. This structure allows the radio-frequency signal fed into the tuner to be hard to carry noises, thereby reducing the error rate.

Unbalance-balance conversion circuit 21 converts an unbalanced radio-frequency signal supplied from antenna 20 into a balanced radio-frequency signal.

Even if antenna 20 tunes a signal to a desired signal, and suppresses useless radio-frequency signals, a greater distance between antenna 20 and tuner 22 would allow interfering noises to enter into the line therebetween. Therefore, tuning antenna 20 and balance-unbalance conversion circuit 21 are placed moderately close to each other such that the line therebetween has a smaller inductance and the line does not receive the radio-frequency signal. This structure allows the receiver to be resistant to interference, and not to increase an error rate against noises. Circuit 21 and tuner 22 are coupled with a balanced line resistant to interference. Thus even if this line is extended to a longer distance, external noises cannot increase an error rate.

Tuner 22 receives an output from circuit 21 and converts the frequency selected by antenna 20 for performing I/Q demodulation. Tuner 22 comprises input terminals 23a, 23b, radio-frequency amplifier 24, local oscillator 25, mixer 26, surface acoustic wave (SAW) filter 27, I/Q demodulator 28, PLL circuit 31, and quartz oscillator 32.

I/Q demodulator 28 is formed of local oscillator 29 and mixer 30. PLL circuit 31 is loop-coupled to local oscillator 25. Quartz oscillator 32 generates a reference signal of PLL circuit 31. Input terminals 23a, 23b work as balanced input terminals.

Radio-frequency amplifier 24 amplifies the frequency selected by antenna 20, and changes its gain depending on a voltage-change at control terminal 24a.

Mixer 26 receives an output from amplifier 24 at its first input terminal, and its second input terminal receives an output from local oscillator 25. Mixer 26 mixes the oscillating signal of oscillator 25 with the output signal from amplifier 24 and converts them into an intermediate frequency signal as much as 1.5 times of the maximum (max.) frequency (approximately (approx.) 900 MHz) of the signal received. In this first embodiment, the intermediate frequency is 1.2 GHz. The receiver is thus hard to be subjected to interference of second-order or third-order distortion produced by harmonics of television signals and output signals from the local oscillator.

SAW filter 27 receives an output signal from mixer 26, and uses the intermediate frequency as a center frequency of a pass-band of e.g., 6 MHz which is a band of the NTSC television signal. SAW filter 27 has sharp attenuation characteristics, and passes only desired signal frequencies in good quality, so that useless interference can be positively excluded.

In the case of a digital narrow-band television signal, its bandwidth is approx. 428 KHz. An extremely high frequency of 1.2 GHz is used as an intermediate frequency, so that SAW filter 27 can be downsized. As a result, the radio-frequency signal receiver can be also downsized.

In I/Q demodulator 28, mixer 30 receives an output signal from SAW filter 27 at its first input terminal, and its second input terminal receives an output signal from local oscillator 29. Mixer 30 is formed of a first mixer and a second mixer not shown in FIG. 1. The first mixer mixes a signal from local oscillator 29 with a signal from SAW filter 27. The second mixer mixes a signal phase-inverted by 90 degrees of the signal supplied by local oscillator 29 with the signal from SAW filter 27. The respective mixers thus mix the signals independently, so that signal I and signal Q are directly demodulated. This structure saves another detector, and thus downsizes a radio-frequency signal receiver. Approximately the same frequency as the intermediate frequency is used as an oscillation frequency of local oscillator 29, so that signals I and Q are directly demodulated.

PLL circuit 31 includes programmable counter 33, reference counter 34, comparator 35, PLL controller 36, and filter 52. Programmable counter 33 is coupled to local oscillator 25 and frequency-divides an oscillation signal. Reference counter 34 frequency-divides an output from quarz oscillator 32. Comparator 35 receives an output from programmable counter 34 at its first terminal, and its second terminal received an output from reference counter 34. Comparator 35 thus compares the frequencies of those two output signals. PLL controller 36 is interposed between an output from comparator 35 and local oscillator 25, and controls oscillator 25 in response to the comparison by comparator 35.

Programmable counter 33 is coupled with control terminal 33a formed of two wires. Providing control terminal 33a with data changes a frequency-dividing ratio of counter 33, so that the frequency is changed. In other words, the data at control terminal 33a produces a difference between a value frequency-divided by counter 33 and an output from reference counter 34. Comparator 35 compares the differences, and in response to this comparison, PLL controller 36 controls an oscillation frequency of local oscillator 25.

An agreement between the value frequency-divided by programmable counter 33 and the output from reference counter 34 prompts PLL controller 36 to output a lock signal from output terminal 36a.

Demodulator 37 receives an output signal from I/Q demodulator 28, and is formed of orthogonal frequency division multiplexing (OFDM) demodulator 38 and register 39 that controls OFDM demodulator 38, which is controlled in response to data fed into terminal 39a.

Error-corrector 40 outputs a signal to output terminal 41, and is formed of Viterbi corrector 42 and Reed-Solomon corrector 43. Viterbi corrector 42 receives an output from demodulator 37, and an output from Viterbi corrector 42 is supplied to Reed-Solomon corrector 43.

Viterbi corrector 42 determines whether or not a digital signal demodulated is in accordance with a given rule. When a non-accordance is found, Viterbi corrector 42 corrects the signal and restores it. Reed-Solomon corrector 43 further corrects and restores the digital signal already corrected by Viterbi corrector 42. A Reed-Solomon data prepared for correction by Reed-Solomon corrector 43 is attached in advance to video-signal data. Reed-Solomon corrector 43 corrects and restores the digital signal using this Reed-Solomon data and the video signal transmitted.

Broadcasting systems of respective countries use a different number of bits of a digital signal forming the video signal and a different number of bits of the Reed-Solomon data. However, when the error rate in an output from Viterbi corrector 42 is not more than 0.0002, the error rate in an output of Reed-Solomon corrector 43 can be zero (0) in general.

Micro-processor (CPU) 44 includes determiner 45, controller 46, memory 47, and switch 49. Determiner 45 receives an output from Viterbi corrector 42, and controller 46 receives an output from determiner 45. Switch 49 receives an output from controller 46, and switches signals supposed to be supplied to control terminals 20c, 24a, 33a, and 39a.

Determiner 45 monitors an error rate after the Viterbi correction, and when the error rate exceeds 0.0002 and determines that the error rate becomes stable, controller 46 selects any one of control terminals 20c, 24a, 33a, and 39a before outputting a control signal.

Respective sections of the receiver are controlled by the signal supplied from controller 46. Determiner 45 only determines an error rate, thus it cannot determine in what status the respective sections are. The respective sections refer to tuning antenna 20, radio-frequency amplifier 24, PLL circuit 31, and demodulator 37. In this circumstance, if controller 46 controls the respective sections although the error rate is not more than 0.0002, the characteristics sometimes change such that the error rate increases. In other words, controller 46 varies a control voltage for the respective sections to change in a certain direction temporarily, and determiner 45 detects this result and determines whether or not the error rate becomes greater or smaller.

Determiner 45, however, does not determine whether or not the respective sections work in an optimum status, thus the control voltage does not always change for the error rate to improve. When a control voltage of a section to be controlled is at an optimum level, a change of the voltage increases the error rate.

As discussed above, when determiner 45 determines an error rate at not more than 0.0002, and assume that the section is controlled in another way, then the characteristics sometimes change such that the error rate increases.

Although determiner 45 skips to determine that the error rate becomes stable, controller 46 starts a new control, and this new control is sometimes carried out before the improvement done by the previous control against the error rate becomes stable. In this case, the control becomes unstable, and the error rate increases by contraries, which produces a block-noise, and it takes time to reduce this block-noise. This is the reason why controller 46 starts a new control after determiner 45 determines that the error rate becomes stable. Then a stable control can quickly reduces the block-noise.

As such, controller 46 starts controlling in the circumstances that determiner 45 determines that an error rate exceeds 0.0002 and the error rate becomes stable. When the error rate decreases under this control, a control voltage is further changed in the same direction. However, when the error rate increases under this control, the control voltage is changed in the inverse direction. The respective sections have their own minimum point of the error rate, i.e., an optimum point, in their control voltages, and if the control voltage is changed over this point, the error rate increases by contraries. An optimum control point of the respective sections can be thus found, so that the receiver receives a signal in the optimum condition. As a result, the error rate can be reduced.

Next, the way how determiner 45 determines that the error rate becomes stable is described hereinafter. Determiner 45 monitors output signals supplied from Viterbi corrector 42 periodically, and stores error rates in memory 47. Determiner 45 compares a new error rate with the last one stored in memory 47. No difference between the two error rates prompts determiner 45 to determine that the error rate becomes stable.

If determiner 45 only carries out this comparison, a new control is not executed until an error rate becomes stable even if the error rate increases due to external disturbance. Thus it takes time until the error rate becomes stable. Thus when the control voltage is changed, the times needed until the error rates of the respective sections become stable are stored in memory 47. If the error rate does not become stable even if the time exceeds the time stored in memory 47, it is assumed that the error rate is stabilized, and the new control takes place.

In other words, in the case that the error rate is not yet stabilized even if a time exceeds the given time for stabilizing an error rate of each section, another factor other than the control or new external disturbance causes this non-stable error rate. Then a new control is set to take place. This mechanism allows re-starting a control quickly when the error rate increases due to an abrupt change of radio-wave or receiving conditions.

In the case that when a lapse of time exceeds the longest time among the times needed for stabilizing the error rates of each section, it is determined that the error rate is stabilized, it is not needed to store the times for each section. As a result, memory 47 needs only a small capacity, and the receiver can use an inexpensive memory.

Terminal 36a outputs a lock signal supplied from PLL controller 36 to controller 46, so that controller 46 recognizes that PLL circuit 31 is locked, which proves that tuner 22 is in a stable status. As a result, PLL circuit 31 can be positively controlled.

When PLL circuit 31 outputs a signal informing controller 46 of being out of lock due to a deviation of the oscillation frequency, controller 46 can controls tuner 22 based on this signal by skipping a determination of the error rate. An error rate of data can be thus stabilized sooner, and if this out-of-lock in tuner 22 produces a block noise which causes a lack of a video, the video can be restored within a short time.

The structure discussed above allows controller. 46 to selectively control tuning antenna 20, radio-frequency amplifier 24, PLL circuit 31, and demodulator 38, thereby improving the error rate advantageously. In the case when a digital television signal is received by this receiver, a block noise on a video due to increasing of the error rate of a receiving signal data is hard to be produced. As a result, contents broadcasted are displayed with high quality image.

Controller 46 starts controlling each section sequentially in the order of a shorter time needed for stabilizing an error rate of a section controlled. In other words, a control starts on the section requiring the shortest total time of the time needed until the section controlled becomes stable and the time needed for processing in the circuits of later stages. Then the control moves on to the section requiring the second shortest time, and onward. This mechanism allows improving the error rate quickly. Thus a block noise on a video due to degradation of the error rate can be quickly suppressed. Even if the video lacks a part, the video can be improved fine enough for the lacked part not to be recognized.

If a time needed for each section to be stabilized is substantially shorter than a process time required in each section, a control starts with demodulator 37 close to determiner 45, then a quicker determination by determiner 45 can be expected. The reason is described below:

A time between an end of control and a start of determination is approx. a sum of the process time required in the controller and the process time in later stages. Therefore, a section closer to determiner 45 should be controlled in sequence, so that the error rate can be stabilized sooner.

A signal undergoes the circuits of the respective sections between antenna 20 and Viterbi corrector 42, thus, e.g., if a control starts with antenna 20 located in the upper stream, it takes time to inform determiner 45 of the result. Therefore, when a control starts with Viterbi corrector 42 located in the lower stream, the result is detected soon, thereby stabilizing quickly an error rate of data. Thus even if the video lacks a part due to a block noise, the lacked part can be restored within a short time, and the video can be improved fine enough for the lacked part not to be recognized.

In the case that plural sections out of the plurality of sections need to be controlled, for instance, when a receiving channel is changed, a control signal is sent to the sections sequentially in the order of a section requiring the longest time, this is contrary to the case discussed above, before the error rate becomes stable. This mechanism allows the control to become stable quickly. There is another way: after controller 46 sends out all the control signals, the determination about whether or not the error rate is stable can be carried out.

Controller 46 halts controlling when the determiner determines that the bit-error rate is not more than 0.0002. A control current is thus consumed only when the bit-error rate exceeds 0.0002, thereby lowering the power consumption. This feature is advantageously used when the radio-frequency signal receiver is employed in a battery-operated portable apparatus.

All the signal lines coupling radio-frequency amplifier 24, local oscillator 25, mixer 26, SAW filter 27, local oscillator 29, mixer 30 to each other, and their inputs and outputs are formed of balanced lines. To be more specific, mixer 26 and SAW filter 27 are formed of balanced circuits resistant to interference. For instance, if oscillation signals of local oscillators 25, 29 or their harmonics find their way into mixers 26, 30 or SAW filter 27, the interference can be cancelled. This capability of excluding interference can improve S/N of the circuits. Respective distances between local oscillators 25, 29 and mixers 26, 30, SAW filter 27 can be shortened without producing interference.

Partition plates, made from metal, disposed between local oscillators 25, 29 and mixers 26, 30, SAW filter 27 can be eliminated or simplified, so that the radio-frequency signal receiver can be downsized, and the cost thereof can be reduced. In other words, a frame including complicated partition plates is not needed, and a simple cover which shields external disturbance or outgoing leakage signal of radio frequency is needed. As a result, an inexpensive radio-frequency signal receiver can be provided.

As discussed above, since the overall circuits are formed of balanced circuits, closer distances between respective circuits do not cause interference between the respective circuits. Although local oscillators 25, 29 output oscillation signals, they do not degrade the S/N of each circuit. This advantage allows packing amplifier 24, mixers 26, 30, local oscillators 25, 29, and PLL circuit 31 into one IC. A radio-frequency signal receiver in a compact size and of radio productivity is thus obtainable.

In the case when there is an intensified input signal in the neighborhood of a desired channel, a tuned frequency of tuning antenna 20 can be controlled to shift such that the intensified input signal is excluded. This control can prevent the error rate from being degraded due to the intensified input signal.

Further, tuning antenna 20 suppresses the signals of channels other than the desired channel, so that a signal distortion is hard to occur in amplifier 24, which can be thus formed of inexpensive bipolar transistors. In other words, radio-frequency amplifier 24, mixers 26, 30, local oscillators 25, 29, and PLL circuit 31 can be packed into a single bipolar IC. A radio-frequency signal receiver in a compact size and of radio productivity is thus obtainable.

In the case when a broadcasting station intentionally shifts the frequency of a radio-frequency signal from the standard frequency depending on the local area, the receiver can deal with this intentional shift by changing the data of programmable counter 33 in PLL circuit 31.

Exemplary Embodiment 2

Figure 2:
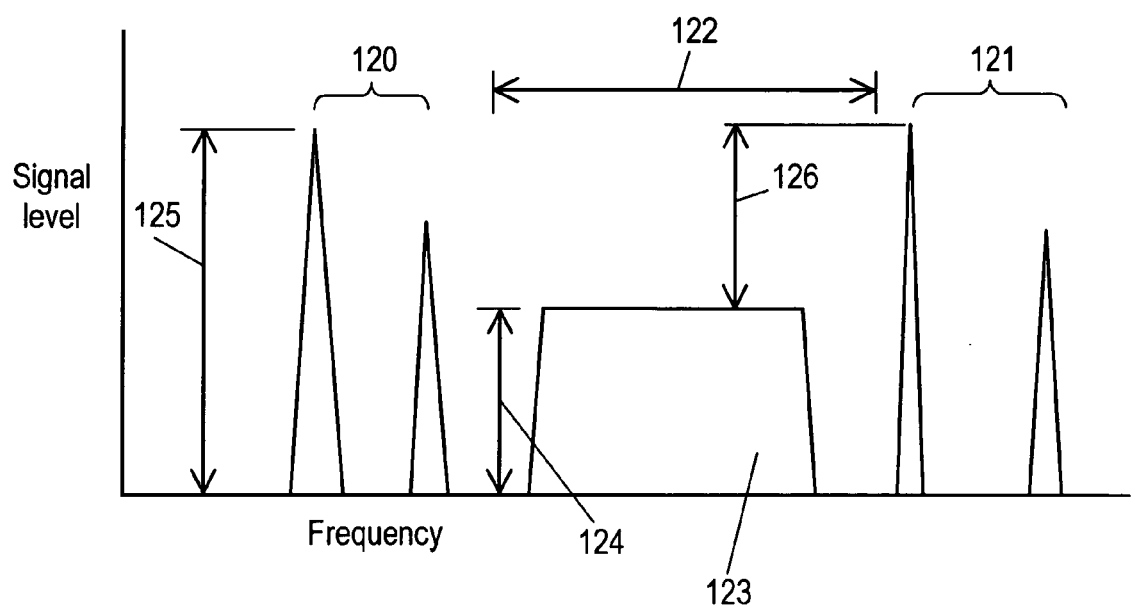
FIG. 2 shows an outline of frequency characteristics of a signal fed into a radio-frequency signal receiver in accordance with a second exemplary embodiment of the present invention.

The radio-frequency signal receiver in accordance with the second exemplary embodiment is demonstrated hereinafter with reference to accompanying drawings. FIG. 2 shows a spectrum of an input signal fed into the radio-frequency signal receiver of the second embodiment.

A digital broadcasting uses frequencies ranging from approx. 90 MHz to approx. 900 MHz, so that the frequency band available to the present analog broadcasting is utilized. Within this band, three signals work co-resident with each other, i.e., existing analog broadcasting signals 120, 121, and digital broadcasting signal 123 which uses open frequency band 122 not used by the analog broadcasting. Signal level 124 of digital broadcasting signal 123 is prepared at a lower level than signal level 125 of analog broadcasting signals 120, 121. The reason is described below:

Conventional analog broadcastings 120, 121 use frequencies such that the adjacent channels have no broadcasting signals. To be more specific, in the case of NTSC television broadcasting, a frequency-band is assigned to respective channels, in general, at an interval of 12 MHz between two channels. An excluding capability of an adjacent channel can be enough to meet the foregoing condition.

However, the presence of the digital broadcasting puts broadcasting signals in the adjacent channel (in the case of NTSC broadcasting, channels at 6 MHz intervals.) Therefore, an existing analog broadcasting receiver could be affected by interference from digital broadcasting signal 123 if signal level 124 of signal 123 is higher than signal level 125 of analog broadcasting signals 120, 121. To avoid this possible problem, signal level 124 should be on the air lower than signal level 125 of analog signals 120, 121 by approx. 20 dB.

A digital broadcasting signal receiver is thus desirable to be capable of receiving this low level signal accurately, and also desirable to exclude the interference from an analog broadcasting signal of higher level when such a signal exists in the neighborhood, e.g., in an adjacent channel.

Figure 3:
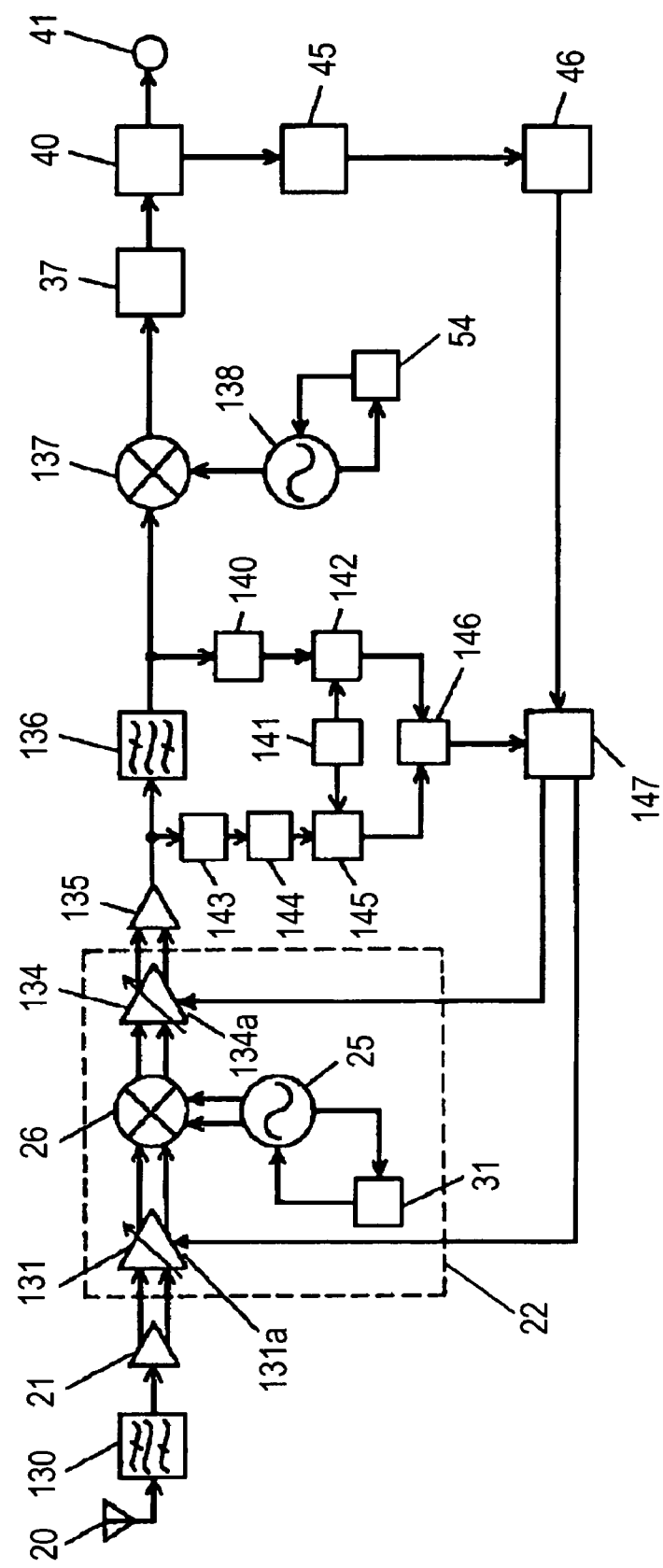
FIG. 3 is a block diagram of a radio-frequency signal receiver in accordance with the second exemplary embodiment.

The radio-frequency signal receiver of the second embodiment decreases a bit-error rate due to interference caused by the analog broadcasting signal. FIG. 3 is a block diagram of the radio-frequency signal receiver of the second embodiment. In FIG. 3, similar elements in FIG. 1 have the same reference marks as those in FIG. 1, and those elements are not detailed here any longer.

Antenna 20 receives a broadcasting signal in which an analog broadcasting and a digital broadcasting co-exist. The signal received is fed into RF filter 130, which remove useless frequencies other than the frequencies within the receiving band. RF filter 130 outputs a signal to unbalance-balance conversion circuit 21, which supplies a balanced signal to radio-frequency amplifier 131. Amplifier 131 changes its gain in response to a control voltage supplied to its control terminal 131a.

Radio-frequency amplifier 131 is formed of a balanced amplifying circuit using MOS transistors because the MOS transistor can produce a wide control range of gain although a noise figure (NF) is not so good, and amplify a wide range of frequency band. Further, the balanced amplifying circuit can exclude interference.

A balanced output from amplifier 131 is fed into a first input terminal of mixer 26, and an balanced output from local oscillator 25 is fed into a second input terminal thereof. Mixer 26 converts a signal of a desired channel into a first intermediate frequency signal of 1.2 GHz. Mixer 26, local oscillator 25 and the line coupling those two elements are formed of balanced circuits highly capable of excluding interference.

Intermediate frequency amplifier 134 receives the balanced output from mixer 26, and changes its gain in response to a voltage supplied to its control terminal 134a. The amplifications by radio-frequency amplifier 131 and intermediate-frequency amplifier 134 allow controlling the gain in a wide variable range. Amplifier 134 is also a balanced amplifier and highly capable of excluding interference. This advantage allows shortening the distances between the respective circuits, and packing them into one IC.

In this second embodiment, mixer 26, local oscillator 25, PLL circuit 31 loop-connected to local oscillator 25, and intermediate-frequency amplifier 134 are all packed into an IC formed of bipolar transistors.

Balance-unbalance conversion circuit 135 converts a balanced output signal from intermediate-frequency amplifier 134 into an unbalanced signal.

SAW filter 136 is coupled to conversion circuit 135. Filter 136 can be a narrow-band filter other than a SAW filter. The center frequency of the pass-band of SAW filter 136 is approx. 1.2 GHz, i.e., the intermediate frequency, and the pass bandwidth is approx. 6 MHz corresponding to the frequency band for one channel. SAW filter 136 removes undesired signals other than the signals of a desired channel.

Second mixer 137 receives an output signal from SAW filter 136 at its first input terminal, and receives an output signal from second local oscillator 138 at its second input terminal. Second mixer 137 converts a first intermediate frequency into a second intermediate frequency lower than the first one.

Demodulator 37 coupled to second mixer 137 demodulates the intermediate frequency, and error-corrector 40 corrects an error of this demodulated signal. The corrected signal is output from output terminal 41.

Level detector 140 receives an output signal from SAW filter 136, and detects a power level of a signal of the desired channel.

Memory 141 stores the following two levels as reference values: one is an optimum level of an output signal from SAW filter 136 for demodulation in demodulator 27 and the other one is a threshold level over which radio-frequency amplifier 131 is saturated.

First calculator 142 receives an output from level detector 140 at its first input terminal, and its second input terminal is coupled to memory 141. First calculator 142 compares a signal level of the desired channel with a reference level of the optimum output signal from SAW filter 136, and outputs the difference between those two levels.

Band-pass filter 143 selectively passes only those signals which interfere with the desired channel during the reception, and of which frequencies close to the intermediate frequency. Band-pass filter 143 has a pass-band (30 MHz) including two channels' worth of band respectively for both of an upper and a lower sides of the receiving channel band.

Peak-power detector 144 receives an output signal from band-pass filter 143, and detects a peak power of the signal. Detector 144 receives signals having 15 MHz band each on both of the upper and lower sides of the desired channel as an approx. center, and detects the signal of the highest level among the signals received.

Second calculator 145 receives an output signal from peak-power detector 144 at its first input terminal, and its second input terminal is coupled to memory 141. Second calculator 145 calculates a difference between a level of the signal detected by detector 144 and the threshold level over which radio-frequency amplifier 131 is saturated, where this threshold level is stored in memory 141, and outputs the difference calculated.

In the case of an agreement between the output from detector 144 and the reference value (the threshold level) stored in memory 141, the level difference becomes zero (0), so that second calculator 145 outputs zero (0). This indicates no signals of high-level exist in the neighborhood of the channel to be received. As such, it is detected whether or not a signal of higher level than the signal of the desired channel exists in the neighborhood of the channel to be received. In the case that the level of the signal detected by peak-power detector 144 is lower than the level stored in memory 141, a level difference of zero (0) is output.

Level determiner 146 receives the difference calculated by first calculator 142 at its first input terminal, and receives the level difference calculated by second calculator 145 at its second input terminal. When the level difference supplied from second calculator 145 is zero (0), level determiner 146 outputs the output supplied from first calculator 142 to gain controller 147. When the level difference supplied from second calculator 145 is not zero (0), level determiner 146 supplies the output from second calculator 145 to gain controller 147.

Gain controller 147 integrates an output signal from third calculator 146 (=level determiner 146) and removes a noise component, then produces a control signal to be supplied to radio-frequency amplifier 131 and intermediate-frequency amplifier 134. The control signal is fed into control terminals 131a and 134a, thereby controlling the gains of those amplifiers to be optimum.

Local oscillator 25 and second local oscillator 138 are respectively loop-connected with PLL circuits 31, 54.

In the radio-frequency signal receiver having the foregoing construction, controls over the gains of amplifiers 131, 134 is described hereinafter. There are following two cases:

(1) No analog signal 120 or 121, which interferes with the reception of desired channel 123, exists in the neighborhood of channel 123.

Calculator 142 outputs a signal indicating the difference between a signal level of the desired channel, the signal level being detected by level detector 140, and the reference value stored in memory 141 to gain controller 147. Gain controller 147 changes the control voltage in response to this difference, so that the signal level of the desired channel becomes in agreement with the reference value.

Controller 46 can exercise control such that the gain of radio-frequency amplifier 131 becomes greater. To be more specific, in the case that a bit-error rate is not less than a given value, the gain of amplifier 131 becomes increasingly greater. In weak electrical field, if radio-frequency amplifier 131 still has room before it is saturated, the greater gain does not cause a greater distortion of a signal. In such a case, a radio-frequency signal receiver of excellent NF is obtainable.

(2) Analog signal 120 or 121 interfering with the reception of desired channel 123 exists in the neighborhood of channel 123.

Level difference 126 shown in FIG. 2 between level 125 of analog signal 120 or 121 and signal level 124 of desired channel 123 is supplied to gain controller 147, which then changes a control voltage in response to this level difference 126.

Figure 4A:
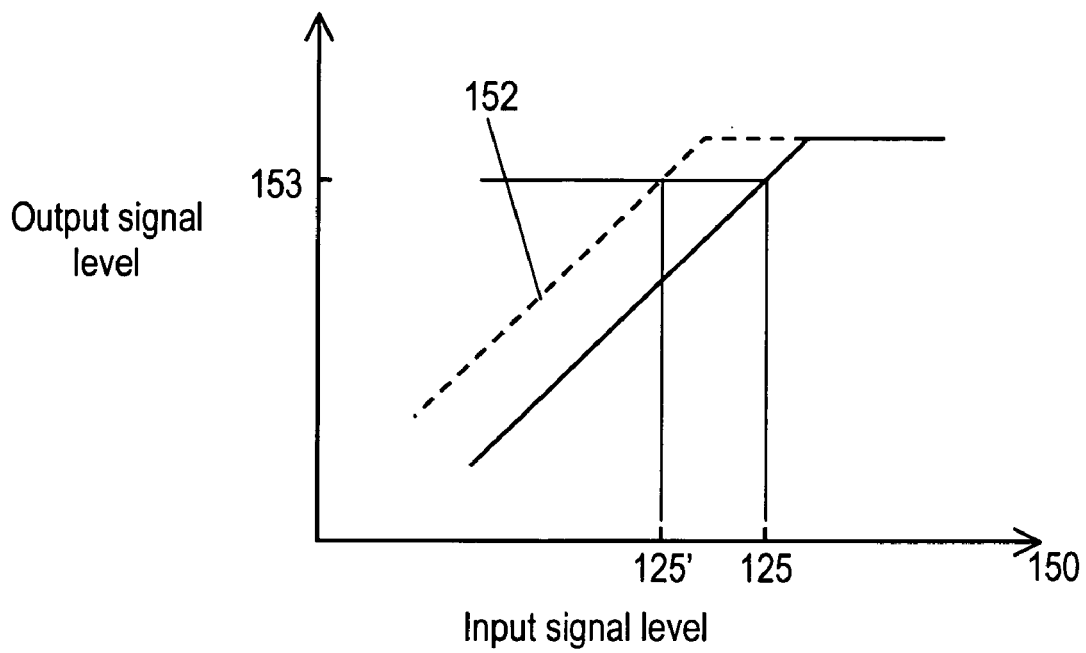
FIGS. 4A, 4B show characteristics of a radio frequency amplifier in accordance with the second exemplary embodiment.
Figure 4B:
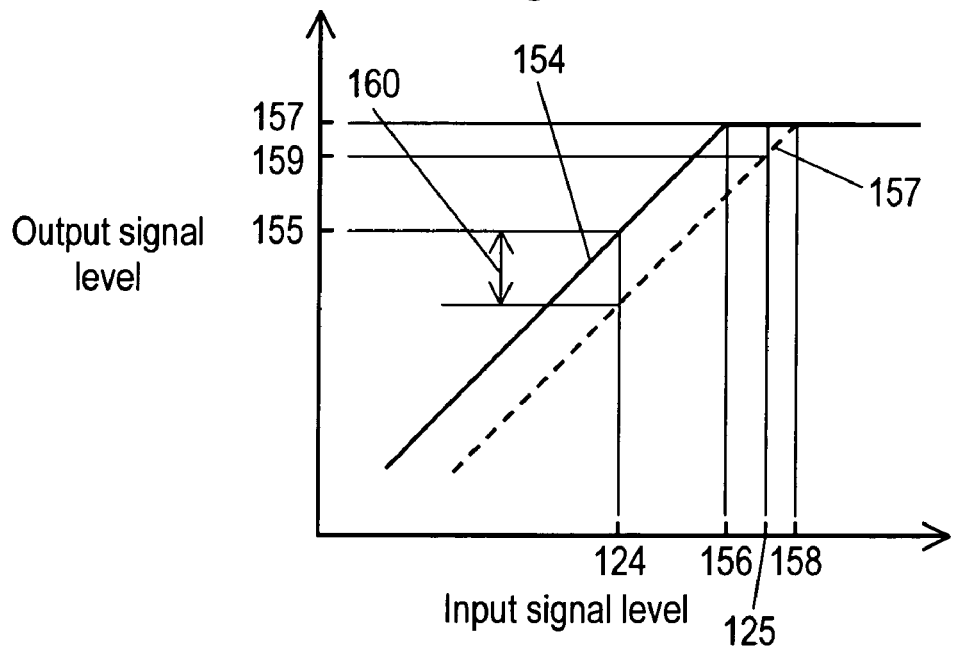
Figure 5:
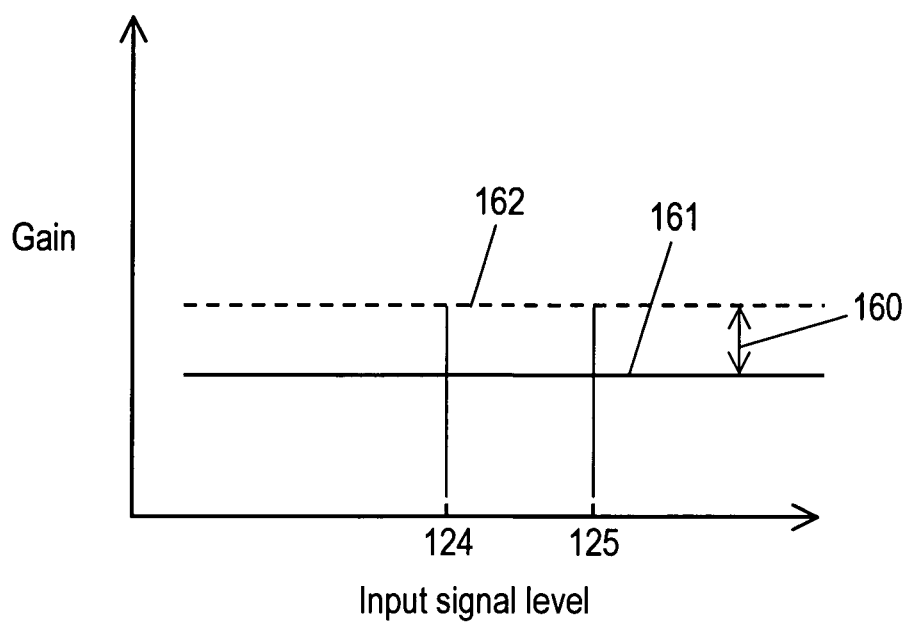
FIG. 5 shows a relation between a level of an input signal fed into the radio frequency amplifier and a gain of an intermediate frequency amplifier.

Next, operations of radio-frequency amplifier 131 and intermediate-frequency amplifier 134 are demonstrated hereinafter. FIGS. 4A, 4B show characteristics of this radio-frequency amplifier, i.e., a relations between an input signal level and an output signal level of radio-frequency amplifier 131. FIG. 5 shows a relation between the input signal level of amplifier 131 and a gain of intermediate frequency amplifier 134. The horizontal-axis indicates the input signal level of amplifier 131, and the vertical-axis indicates the gain of amplifier 134.

In FIGS. 4A and 4B, the horizontal-axis indicates the input signal level of amplifier 131, and the vertical-axis indicates the output signal level of amplifier 131. In FIG. 4A, line 152 represents the output signal level in response to the input signal level of amplifier 131, which is controlled to supply output-level 153 in response to levels 125 and 125' of analog broadcasting signals.

In FIG. 4B, line 154 represents the output signal in response to the input signal level of amplifier 131. Since the digital broadcasting signals have undergone the error correction, amplifier 131 can have a lower NF than that for the analog broadcasting signals. The digital broadcasting signals include many signal components therein, thus they have a large amount of energy. Therefore, receiving the digital broadcasting, radio-frequency amplifier 131 outputs signal level 155 lower than output level 153 shown in FIG. 4A of the analog broadcasting.

When a signal of not less than saturation level 156 is fed into amplifier 131, the amplifier amplifies this signal no more than gain limit 157. Thus when a signal of not less than saturation level 156 is fed into amplifier 131, amplifier 131 produces distortion on the signal, and an interference signal occurs. In other words, if the gain control is carried out only at a level of the desired signal during reception of the digital broadcasting, the output from amplifier 131 is sometimes distorted by the analog broadcasting signal of a greater level.

If the gain is controlled in response to only the peak voltage of the output signal from amplifier 131, it sometimes happens that a signal of output level 155 is controlled to be supplied in response to greater level 125 of the analog broadcasting signal. In such a case, a digital signal supposed to be received cannot be caught sometimes because its output level becomes lower.

To overcome this problem, the receiver of the present invention controls the gain in the following way: In the case that it is determined that an interference signal greater than saturation level 153 does not exist in the neighborhood of a receiving channel during reception of a digital broadcasting, the gain of radio-frequency amplifier 131 is controlled depending on signal level 124 of the receiving channel.

In the case that it is determined that an interference signal (analog broadcasting signal) greater than saturation level 153 exists, gain-curve 154 of amplifier 131 is changed to gain-curve 157 in response to level-difference 126. This mechanism moves a saturation point of input signal level fed into amplifier 131 to saturation point 158. Radio-frequency amplifier 131 outputs a signal at level 159 in response to level 125 of analog signal 121, so that amplifier 131 is not saturated, and amplifier thus can output signals with little distortion.

A signal level of receiving channel 123 of the digital broadcasting, the signal being converted to the first intermediate frequency by mixer 26, is lowered by reduction amount 160. Thus as shown in FIG. 5, intermediate frequency amplifier 134 changes its gain from 161 to 162 in order to compensate reduction amount 160. As such, the output signal level from amplifier 134 becomes approx. a constant value.

Error corrector 40 used in the second embodiment has the same construction as that used in the first embodiment. An output from Viterbi-corrector 42 included in corrector 40 is supplied to determiner 45. When a bit-error rate of signals is not less than 0.0002, determiner 45 sends a signal, indicating the bit-error rate is not less than 0.0002, to controller 46. Controller 46 receives this signal, then instructs gain controller 147 to control the gains of radio-frequency amplifier 131 and intermediate-frequency amplifier 134.

In the case when the bit-error rate of Viterbi-corrector 42 degrades to not less than 0.0002 due to a broadcasting signal of higher level existing in the neighborhood of a digital broadcasting signal of a desired channel, the foregoing structure allows gain controller 147 to control the gains of amplifiers 131 and 134. Thus the gains of amplifiers 131 and 134 are controlled when the bit-error rate at output terminal 41 is not zero (0). The foregoing mechanism realizes a radio-frequency signal receiver having a stable bit-error rate.

Calculator 145 compares an output from level detector 144 with a threshold value, stored in memory 141, over which value radio-frequency amplifier 131 produces a distortion, and controls the gain of amplifier 131. Therefore, even if a broadcasting signal of higher level exists in the neighborhood of a digital broadcasting signal of a desired channel, amplifier 131 is not saturated. As a result, the desired channel can be controlled at an optimum level, and a distortion on an output signal from amplifier 131 can be minimized. The radio-frequency signal receiver having a small bit-error rate is thus obtainable.

Digital broadcastings are available today in a mobile status such as with a cellular phone or in a car, and this trend becomes increasingly popular. In order to meet this market situation, a digital broadcasting receiver in accordance with this second exemplary embodiment uses 1.2 GHz as a first intermediate frequency. This receiver thus does not interfere with cellular phones using 900 MHz band and 1.5 GHz band or personal handy phone systems (PHS) using 1.9 GHz band. This receiver can be incorporated into those portable devices free from interference.

When the receiver moves during the reception of digital signals, radio-wave status such as a distance and a direction to the broadcasting station vary momentarily. The receiver of the second embodiment always determines the bit-error rate during the reception of a desired channel, and detects the peak power of an analog broadcasting signal available within a predetermined frequency band of which approx. center is the desired channel. In this receiver, when the bit-error rate degrades, the gain of the radio-frequency amplifier or the intermediate-frequency amplifier is promptly controlled in response to the peak power detected. This mechanism allows the radio-frequency signal receiver to respond quickly to signal levels momentarily changing due to movement, thereby improving the bit-error rate promptly.

In this radio frequency receiver, the calculation is made by level determiner 146 based on the difference at the output from peak-power detector 144 and the difference at the output from level detector 140. Herein, level determiner 146 may be a simple comparator. In this case, the comparator compares the output from peak-power detector 144 with the output from level detector 140, and when the output from detector 144 is found greater than that from detector 140, the comparator transmits a signal to gain controller 147.

To be more specific, gain controller 147 changes its control voltage a little to reduce the gain of radio-frequency amplifier 131 responsive to this signal. At this time, the smaller gain of amplifier 131 reduces a level of an output signal from mixer 133. In order to compensate this reduction, gain controller 147 changes its control voltage a little to increase the gain of intermediate-frequency amplifier 134.

In the case when a comparator is used as level determiner 146, a calculation is not carried out, and a third calculator is not needed in this case, so that a response speed for controlling the gain becomes faster. A degradation of the bit-error rate due to a change in a signal level of an adjacent channel can be improved promptly. This feature is an important advantage for the apparatus such as a cellular phone or a radio-frequency signal receiver mounted to a car, which receives signals changing momentarily.

In the radio-frequency signal receiver in accordance with the second embodiment, level detector 140 detects a signal level of a desired channel; however, peak-power detector 144 can detect this signal level instead. In such a case, detector 144 outputs this signal level to calculator 142.

In this second embodiment, level detector 140 detects the signal level of the desired channel using an output from SAW filter 136. However, if peak-power detector 144 is able to detect both of the signal level of the desired channel and the peak power, the output from peak-power detector 144 is split, and only the signal level of the desired channel can be supplied to level detector 140. In such a case, the signal level does not lower by an amount lost by SAW filter 136. Thus the signal level can be accurately detected.

In the foregoing discussion, respective components such as level detector 140, calculator 142, peak-power detector 144, second calculator 145, and level determiner 146 are formed of circuits respectively. The operations of those circuits can be executed by a CPU as steps of a program. In this case, the respective circuits of level detector 140, calculator 142, peak-power detector 144, second calculator 145, and level determiner 146 can be simplified, and the radio-frequency signal receiver can be downsized and its cost can be reduced.

In the construction discussed above, since no filters exist between the radio-frequency amplifier and the mixer, no loss is produced in between and a smaller degradation of NF is expected. The intermediate-frequency amplifier does not necessary use an expensive gallium arsenide transistor having an excellent NF, but can use an inexpensive transistor of poor NF instead, so that an inexpensive radio-frequency signal receiver is obtainable. Further, the intermediate-frequency amplifier can be packed in an IC together with the mixer and the local oscillator, so that the receiver can be downsized.

In the construction discussed previously, in the case although the gain controller controls the gain of the radio-frequency amplifier or the intermediate-frequency amplifier, the bit-error rate does not lower to not more than a given rate, the gain can be restored to the value before the control is executed. Because either one of the amplifiers does not cause to degrade the bit-error rate.

As discussed above, according to the second embodiment, even if a broadcasting signal of high level exists in the neighborhood of a digital broadcasting signal of a desired channel, the radio-frequency amplifier is not saturated, and the desired channel is controlled to be at an optimum level. Further, the gains of the radio-frequency amplifier and the intermediate-frequency amplifier are controlled in response to a level of the receiving signal so that the desired channel can be at the optimum level. The radio-frequency signal receiver having a smaller bit-error rate is thus obtainable.

Exemplary Embodiment 3

Figure 6:
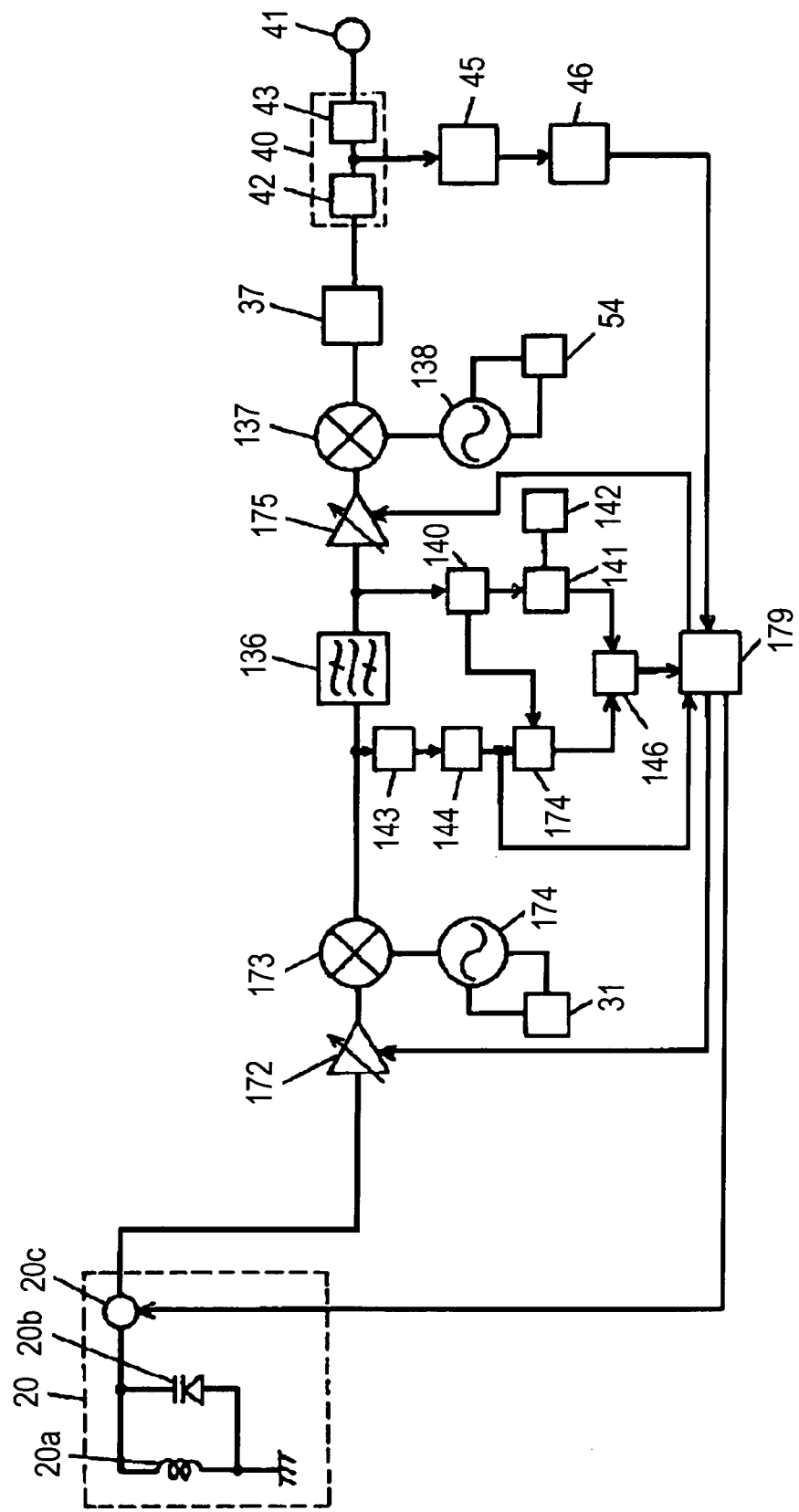
FIG. 6 is a block diagram of a radio-frequency signal receiver in accordance with a third exemplary embodiment.

The third exemplary embodiment is demonstrated hereinafter with an accompanying drawing. FIG. 6 is a block diagram illustrating a radio-frequency signal receiver in accordance with the third embodiment. In FIG. 6, elements similar to those in FIG. 1 and FIG. 3 have the same reference marks, and they are not detailed here.

In FIG. 6, tuning antenna 20 changes a tuned frequency in response to a signal supplied to its control terminal 20c. Radio-frequency amplifier 172 receives an output from antenna 20, and its gain is variably controlled. Mixer 173 receives an output from amplifier 172 at its first input terminal, and its second input terminal receives an output from local oscillator 174. Mixer 173 converts the frequency of its input signal into a first intermediate frequency.

SAW filter 136 removes useless signals from an output signal supplied from intermediate-frequency amplifier 175, and obtains a signal of a given band including the first intermediate frequency. Intermediate-frequency amplifier 175 receives an output from SAW filter 136, and its gain is variably controlled, so that the output signal from SAW filter 136 is amplified.

An output signal from amplifier 175 is converted to a second intermediate frequency by second mixer 137. Demodulator 37 demodulates the second intermediate frequency signal. Error corrector 40 receives an output from demodulator 37, and outputs a signal to output terminal 41. Error corrector 40 is formed of Viterbi-corrector 42 that receives the output from demodulator 37, and Reed-Solomon corrector 43 that receives an output from Viterbi-corrector 42. Viterbi-corrector 42 is coupled with determiner 45, which supplies an output to controller 46. Determiner 45 and controller 46 are accommodated in CPU 44.

Second calculator 174 receives an output from peak-power detector 144 at its first input terminal, and its second input terminal receives an output from level detector 140. Peak-power detector 141 receives a signal of the first intermediate frequency through filter 143.

On the other hand, first calculator 141 receives the output from level detector 140 and an output from memory 142. First calculator 141 and second calculator 174 supply their outputs to level determiner 146. Level determiner 146, peak-power detector 144, and controller 46 supply their outputs to gain controller 179. Controller 179 then outputs a signal to control terminal 20c of antenna 20, thereby controlling the tuning frequency.

In the construction discussed above, second calculator 174 calculates a level difference between a signal taken out from an upper stream of SAW filter 136 and a signal taken out from a lower stream of SAW filter 136. The signal from the upper stream includes a large interference signal, and the signal from the lower stream includes a signal with an interference signal suppressed. Then second calculator 174 outputs the level difference between those two signals.

First calculator 141 compares an output signal level of level detector 140 with a given value stored in memory 142, and outputs the level difference.

Level determiner 146 compares an error signal from calculator 141 with an error signal from second calculator 174, and outputs the difference to gain controller 179, which then compares an output signal level of peak-power detector 144 with a signal level at which radio-frequency amplifier 172 is saturated. When the former is greater than the latter, gain controller 179 determines that radio-frequency amplifier 172 produces distortion on a signal, and controls the gains of amplifier 172 and intermediate-frequency amplifier 175 in response to a signal level of level determiner 146. Second calculator 174 receives an output from level detector 140.

If an output from peak-power detector 144 agrees with an output from level detector 140, second calculator outputs zero (0), which means that no signal of higher level exists in the neighborhood of a receiving channel. The foregoing structure thus can detect whether or not a signal of higher level than a signal of the desired channel exists in the neighborhood of the desired channel.

Error corrector 40 and determiner 45 in this third embodiment use the same construction as those in the second embodiment. When a bit-error rate of a signal exceeds 0.0002 through Viterbi-correction, determiner 45 sends the signal, indicating that the bit-error rate exceeds 0.0002, to controller 46, which receives this signal and then sends a signal instructing gain controller 179 to control radio-frequency amplifier 172 and intermediate-frequency amplifier 175.

In other words, determiner 45 instructs gain controller 179 to control amplifiers 172 and 175 only when the bit-error rate degrades to not less than 0.0002. Therefore, the gains of amplifiers 172 and 175 are controlled when the bit-error rate at output terminal 41 is not any more zero (0). As a result, the radio-frequency signal receiver having a stable bit-error rate is obtainable.

Similar to the second embodiment, during the reception of a desired channel, the bit-error rate is always determined, and a peak power of an analog broadcasting signal is detected, where this signal is available within a predetermined frequency band of which approx. center is the desired channel. This mechanism allows the radio-frequency signal receiver in a mobile apparatus to respond quickly to signal levels momentarily changing due to movement, thereby improving the bit-error rate of the receiver in the mobile apparatus promptly.

In this third embodiment, gain controller 179 controls a tuned frequency of tunable antenna 20, and receives an error signal from the level determiner, and then changes the tuned frequency of tunable antenna 20 a little from the frequency of the desired channel, thereby attenuating a signal of the adjacent channel. This control can thus increase the attenuation amount of an interference analog signal existing in the neighborhood of the desired channel. However, the change of the tuned frequency from the frequency of the desired channel increases a loss with respect to a signal of the desired channel.

In this third embodiment, in the case when second calculator 174 outputs a value other than zero (0), namely, when analog broadcasting signals 120 or 121 exists in the neighborhood of desired channel 123, controller 46 executes the following control in order to overcome the problem discussed above:

Controller 46 changes the tuned frequency of tunable antenna 20 a little from the frequency of the desired channel, and in order to compensate the attenuation of the desired channel signal due to this change, controller 46 also exercises control such that the gain of radio-frequency amplifier 172 or intermediate frequency amplifier 175 increases. This control makes it hard to provide radio-frequency amplifier 172 with an interference signal of an adjacent channel, so that amplifier 172 produces smaller distortions. Further, demodulator 37 processes signals at a given level. As a result, the bit-error rate can be lowered.

Radio-frequency amplifier 172, mixer 173, and local oscillator 174 are formed of unbalanced circuits; however, they can be formed of balanced circuits similar to those in the second embodiment.

The tuned frequency can be controlled in the following way: Filter 143 includes two filters, i.e., one has a receiving channel band and its upper band, the other one has the receiving channel band and its lower band. Peak-power detector 144 detects through which filter of those two filters an interference signal of higher level than the desired channel is supplied.

Peak-power detector 144 is coupled to controller 46, and inform controller 46 of the information about from which filter of the foregoing two filters the interference signal is detected, namely, the information whether the frequency of the detected signal is on the upper side or the lower side of the frequency of the desired channel. Controller 46 controls gain controller 179 to change the tuned frequency of antenna 20 in the inverse direction to the interference signal, so that proper control is exercised.

The tuning antenna under the control of the controller removes useless signals other than the desired channel before the signals are fed into the tuner. Thus the occurrence of spurious signal, second-order and third-order distortions other than the desired signals is prevented. As a result, a robust shielded enclosure and a partition plate needed for preventing a spurious signal, second-order and third-order distortions are not required any more, thereby simplifying the shielding construction.

Exemplary Embodiment 4

Figure 7:
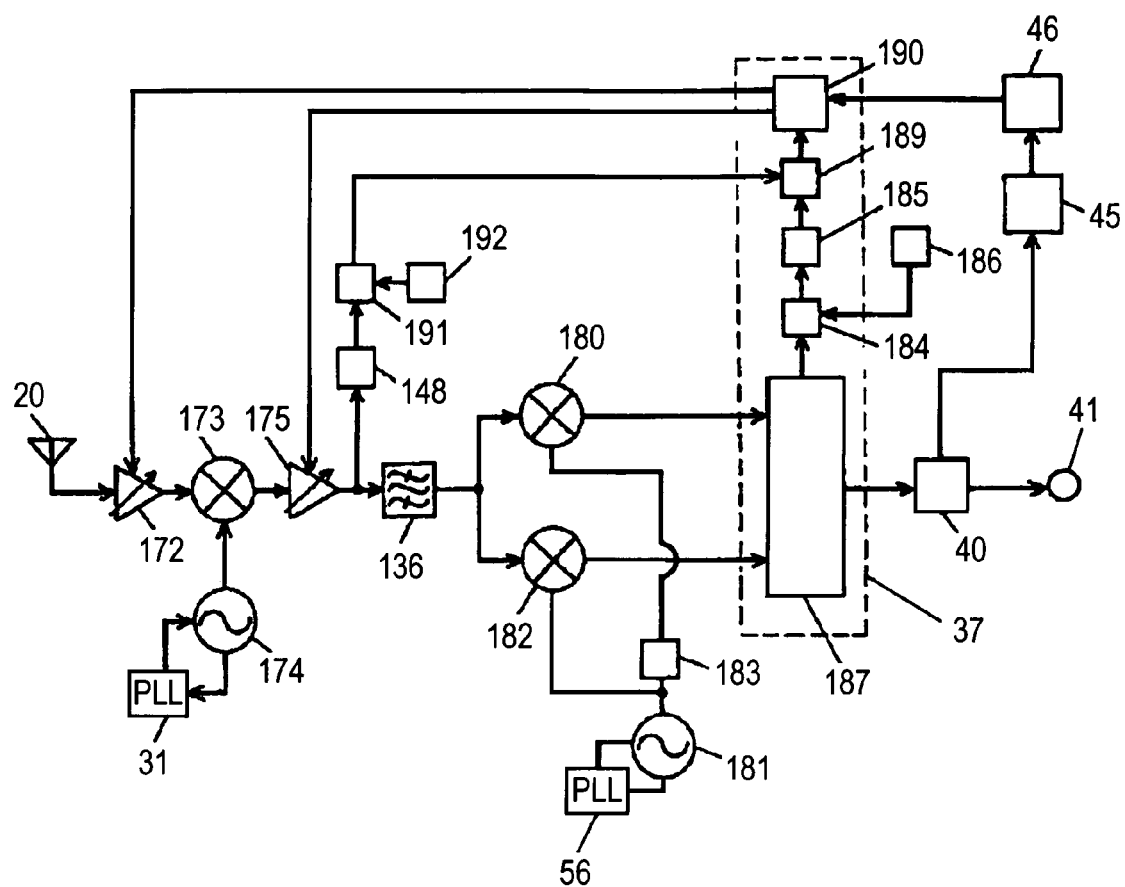
FIG. 7 is a block diagram of a radio-frequency signal receiver in accordance with a fourth exemplary embodiment.

A radio-frequency signal receiver in accordance with the fourth exemplary embodiment is demonstrated hereinafter with reference to an accompanying drawing. FIG. 7 is a block diagram of the radio-frequency signal receiver of the fourth embodiment. In FIG. 7, similar elements to those in FIG. 1 or FIG. 3 have the same reference marks, and they are not detailed here.

In FIG. 7, tuning antenna 20, which is a tunable antenna changes its tuned frequency in response to the control voltage, and outputs a signal to radio-frequency amplifier 172. Mixer 173 receives an output from amplifier 172 at its first input terminal, and its second input terminal receives an output from local oscillator 174. Mixer 173 outputs a signal to intermediate-frequency amplifier 175.

The gains of amplifiers 175 and 172 are controlled in response to a voltage supplied to their respective control terminals. Intermediate-frequency amplifier 175 outputs a signal to SAW filter 136.

Mixer 182 receives an output from SAW filter 136 at its first input terminal, and its second input terminal receives an output from local oscillator 181. Mixer 180 receives the output from SAW filter 136, and its second input terminal receives an output from local oscillator 181 via 90° phase-shifter 183.

Local oscillator 181 oscillates approx. the same frequency as the first intermediate frequency. PLL circuit 56 is loop-coupled to oscillator 181. Mixers 180, 182 mix an oscillating signal of oscillator 181 with the first intermediate frequency, and output directly I, Q signals of different phase by 90 degrees from each other. Thus no detectors for I, Q signals are needed. The compact and inexpensive radio-frequency signal receiver is thus obtainable.

I, Q signals are fed to demodulator 187 for demodulation. Demodulator 187, level detector 184, calculator 185, level determiner 189, and gain controller 190 are accommodated in one CPU, thus the receiver can be downsized.

Level detector 184 calculates a difference between a signal level of demodulator 187 and the given value stored in memory 186. In the case when a signal demodulated by demodulator 187 becomes a predetermined signal level, this given value is used as the predetermined signal level.

Peak-level detector 191 receives an output from filter 148 at its first input terminal, and its second input terminal is coupled to memory 192. Detector 191 outputs a signal to determiner 189.

Memory 192 stores a power level that is supposed to be determined an analog broadcasting. In the fourth embodiment, memory 192 stores the max. signal level of a digital broadcasting in strong electrical field as a reference value.

Peak level detector 191 detects a peak power of a band covering adjacent several channels except the receiving channel. If the difference between level detected and the reference value stored in memory 192 is greater than a predetermined value, peak-level detector 191 determines that there is a channel having a high level signal that produces distortion on a receiving signal. At this time, detector 191 sends a signal, indicating a presence of an interference channel, to level determiner 189.

In the case when level determiner 189 does not receive the signal indicating the presence of an interference channel, determiner 189 sends the information indicating whether or not calculator 185 outputs a difference to gain controller 190. When controller 190 receives the signal indicating an output showing a difference, controller 190 controls, corresponding to a predetermined voltage, the gains of radio-frequency amplifier 172 and intermediate-frequency amplifier 175.

When level determiner 189 receives the signal indicating the presence of the interference channel from peak-level detector 191, determiner 189 sends information indicating the presence of the interference channel to gain controller 190.

When determiner 45 determines that the bit-error rate exceeds 0.0002, controller 46 sends a signal indicating this fact to gain controller 190. Based on this signal from controller 46, gain controller 190 changes a gain control voltage, corresponding to a predetermined voltage, of radio-frequency amplifier 172 and intermediate-frequency amplifier 175. Gain controller 190 thus reduces the gain of amplifier 172, and increases the gain of amplifier 175 for compensating the reduction.

When the bit-error rate of Viterbi-corrector 42 degrades to not less than 0.0002 due to a broadcasting signal of high level existing in the neighborhood of a signal in a desired digital broadcasting channel, gain controller 190 controls the gains of radio-frequency amplifier 172 and intermediate-frequency amplifier 175. As a result, when the bit-error rate at output terminal 41 is not zero (0) any longer, the gains of amplifiers 172 and 175 are controlled. The radio-frequency signal receiver having a stable bit-error rate is thus obtainable.

Further, peak-level detector 191 controls the gain of radio-frequency amplifier 172 in response to the difference between the peak-level detected and a threshold value stored in memory 192. Therefore, even if a broadcasting signal of high level exists in the neighborhood of a digital broadcasting signal of a desired channel, radio-frequency amplifier 172 is not saturated. The desired channel is controlled to be an optimum level, so that radio-frequency amplifier 172 produces smaller distortion. As a result, the radio-frequency signal receiver having a smaller bit-error rate is obtainable.

Exemplary Embodiment 5

Figure 8:
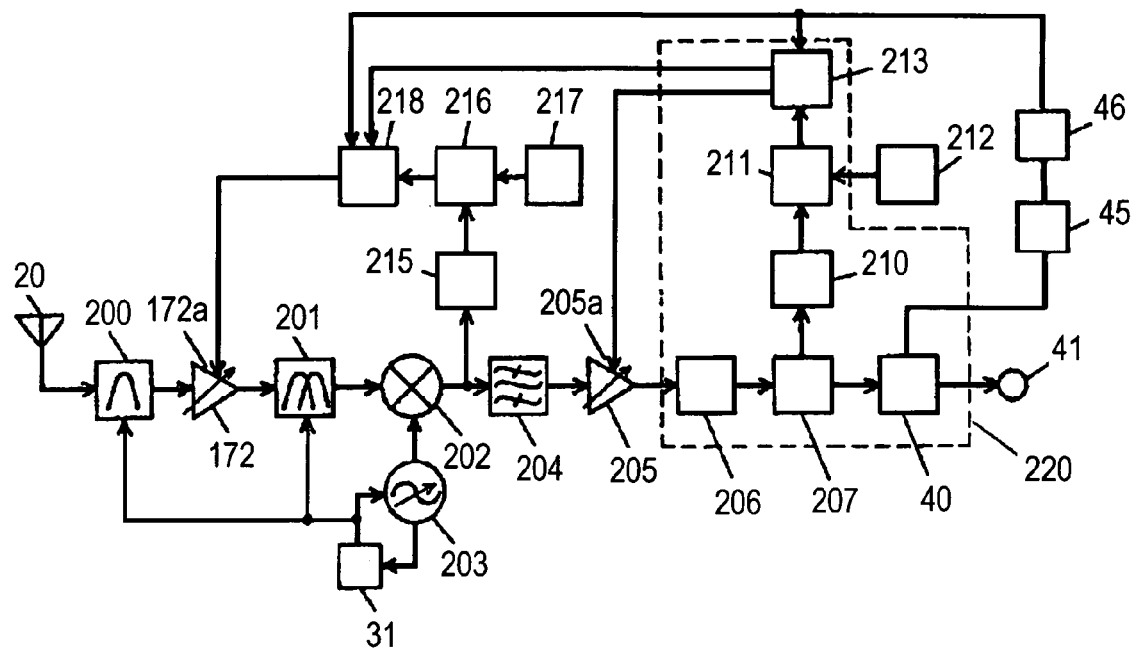
FIG. 8 is a block diagram of a radio-frequency signal receiver in accordance with a fifth exemplary embodiment.

A radio-frequency signal receiver in accordance with the fifth exemplary embodiment is demonstrated hereinafter with reference to an accompanying drawing. This fifth embodiment uses the present invention in a single conversion tuner. FIG. 8 is a block diagram illustrating the radio-frequency signal receiver of the fifth embodiment. In FIG. 8, similar elements to those in FIG. 1 or FIG. 3 have the same reference marks, and those elements are not detailed here.

In FIG. 8, antenna 20 is coupled with antenna filter 200 which is a single tuned filter, in which a frequency of a desired channel becomes its tuned frequency. Antenna filter 200 outputs a signal to radio-frequency amplifier 172.

Interstage filter 201 receives an output from amplifier 172, namely, it receives a signal amplified. Filter 201 is a multi-tuned filter having two tuning circuits. Since this multi-tuned filter 201 has two tuning points, the two tuning points are adjusted respectively such that the frequency of a desired channel can be approx. the center of the pass-band.

Mixer 202 receives an output from interstage filter 201 at its first input terminal, and its second input terminal receives an output from variable-frequency local oscillator 203. Mixer 202 converts a signal of the desired channel among the radio-frequency signals supplied into an intermediate frequency of approx. 57 MHz.

SAW filter 204 receives an output from mixer 202. Filter 204 has a pass-band of approx. 6 MHz, and its center frequency is 57 MHz generally equal to the intermediate frequency. Filter 204 attenuates positively the signals, such as adjacent signals, apart from the center frequency by 6 MHz and more.

Intermediate-frequency amplifier 205 receives an output from SAW filter 204, and can change a gain for amplification in response to a voltage supplied to its control terminal 205a. Amplifier 205 receives only an intermediate-frequency signal, so that it is not saturated by interfering analog broadcasting signals. As a result, amplifier 205 produces only small distortion on a signal.

Since a signal undergoes antenna filter 200, interstage filter 201, SAW filter 204 or the like, the signal level is lowered, so that intermediate-frequency amplifier 205 desirably employs a transistor of excellent NF.

Analog-digital converter 206 receives an output from amplifier 205, and the digital signal converted here is supplied to demodulator 207. The signal demodulated is fed into error corrector 40, of which first output is supplied to output terminal 41 and second output is supplied to determiner 45. Determiner 45 outputs a signal to controller 46.

Level detector 210 receives an output from demodulator 207 and detects the level of the output signal. Calculator 211 receives an output from level detector 210 at its first input terminal, and its second terminal is coupled to memory 212. Calculator 211 calculates a difference between a level of the detected output signal from demodulator 207 and a value stored in memory 212, which stores an optimum signal level for the demodulator. In other words, calculator 211 determines whether or not the signal level detected by level detector 210 is an optimum value.

Gain controller 213 receives an output from calculator 211 at its first input terminal, and its second input terminal receives an output from the controller. Gain controller 213 outputs a signal to control terminal 205a of intermediate-frequency amplifier 205. When calculator 211 outputs the difference, gain controller 213 changes it control voltage in response to the difference, thereby changing the gain of amplifier 205.

Peak-power detector 215 receives an output from mixer 202, and outputs a signal to a first input terminal of level determiner 216, of which second input terminal is coupled to memory 217. Memory 217 stores a reference value, i.e., a power level of the threshold over which radio-frequency amplifier 172 produces distortion.

Level determiner 216 calculates a level difference between the output from detector 215 and the reference value stored in memory 217. Gain controller 218 is interposed between an output terminal of level detector 216 and control terminal 172a of radio-frequency amplifier 172. Gain controller 213 outputs a signal also to gain controller 218. The section enclosed with dotted lines 220 can be formed of one block such as an IC.

An operation of this fifth embodiment is demonstrated hereinafter. A tuned frequency of antenna filter 200 is equal to a frequency of a desired channel. Antenna filter 200 thus attenuates signals other than the signal of the desired channel. Antenna filter 200 is formed of a single-tuned circuit in order to minimize the loss of signals and get a better NF. Signals of adjacent channels apart only by 6 MHz from the desired channel frequency are thus attenuated as small as 10 dB.

There is a level difference of approx. more than 40 dB between the analog broadcasting and the digital broadcasting. In the case when an analog broadcasting exists in an adjacent channel, the signal of the analog broadcasting undergone antenna filter 200 stays still in a high level.

In this fifth embodiment, peak-power detector 215 detects the peak-power of the band covering several adjacent channels except the receiving channel. When the signal level detected by peak-power detector 215 is greater than the reference value stored in memory 217, it is determined that radio-frequency amplifier 172 produces a distortion, and the level difference is supplied to gain controller 218. Controller 218 then changes a control voltage at the control terminal of amplifier 172 in response to the level difference received.

Calculator 211 outputs a signal of difference between the signal level detected by level detector 210 and the optimum value to gain controller 213. Gain controller 213 then controls the gain of intermediate-frequency amplifier 205 in response to the signal of difference.

Gain controller 218 controls the gain of radio-frequency amplifier 172 in response to the signal supplied from level determiner 216. At this time, if an interference signal of much higher level exists, the gain of amplifier 172 is reduced by the control of gain controller 218. In such a case, even if intermediate-frequency amplifier 205 disposed in the lower stream produces the max. gain, a voltage of the demodulator sometimes does not reach a given value. In this case, NF of the signal degrades and the bit-error rate also degrades.

In this fifth embodiment, when intermediate-frequency amplifier 205 produces max. gain (i.e. the control voltage is raised to the max. voltage), gain controller 213 instructs gain controller 218 to include the output signal so as to make the gain of radio-frequency amplifier 172 greater.

The foregoing construction realizes the following mechanism: When the bit-error rate of Viterbi-corrector 42 degrades to not less than 0.0002 due to a broadcasting signal of high level existing in the neighborhood of a signal in a desired digital broadcasting channel, gain controller 218 controls the gains of radio-frequency amplifier 172 and intermediate-frequency amplifier 205. As a result, when the bit-error rate at output terminal 41 is not zero (0) any longer, the gains of amplifiers 172 and 205 are controlled. The radio-frequency signal receiver having a stable bit-error rate is thus obtainable.

Peak-power detector 215 detects a signal of a channel existing in a specified frequency band based on the signal of the desired channel as the center. When this detected level is greater than that of the signal of the desired channel, gain controller 218 controls the gain of amplifier 172 to decrease such that radio-frequency amplifier 172 is not saturated even a high level signal is fed thereto. Therefore, even if an analog broadcasting signal of high level exists in the neighborhood of a digital broadcasting signal of a desired channel, radio-frequency amplifier 172 is not saturated. The desired channel is thus controlled to be an optimum level. As a result, the radio-frequency signal receiver having a smaller bit-error rate is obtainable.

Since the receiver includes single-tuned filter 200 in the upstream from radio-frequency amplifier 172, interference signals of adjacent channels can be attenuated in advance. Amplifier 172 is thus much harder to produce distortion.

Exemplary Embodiment 6

Figure 9:
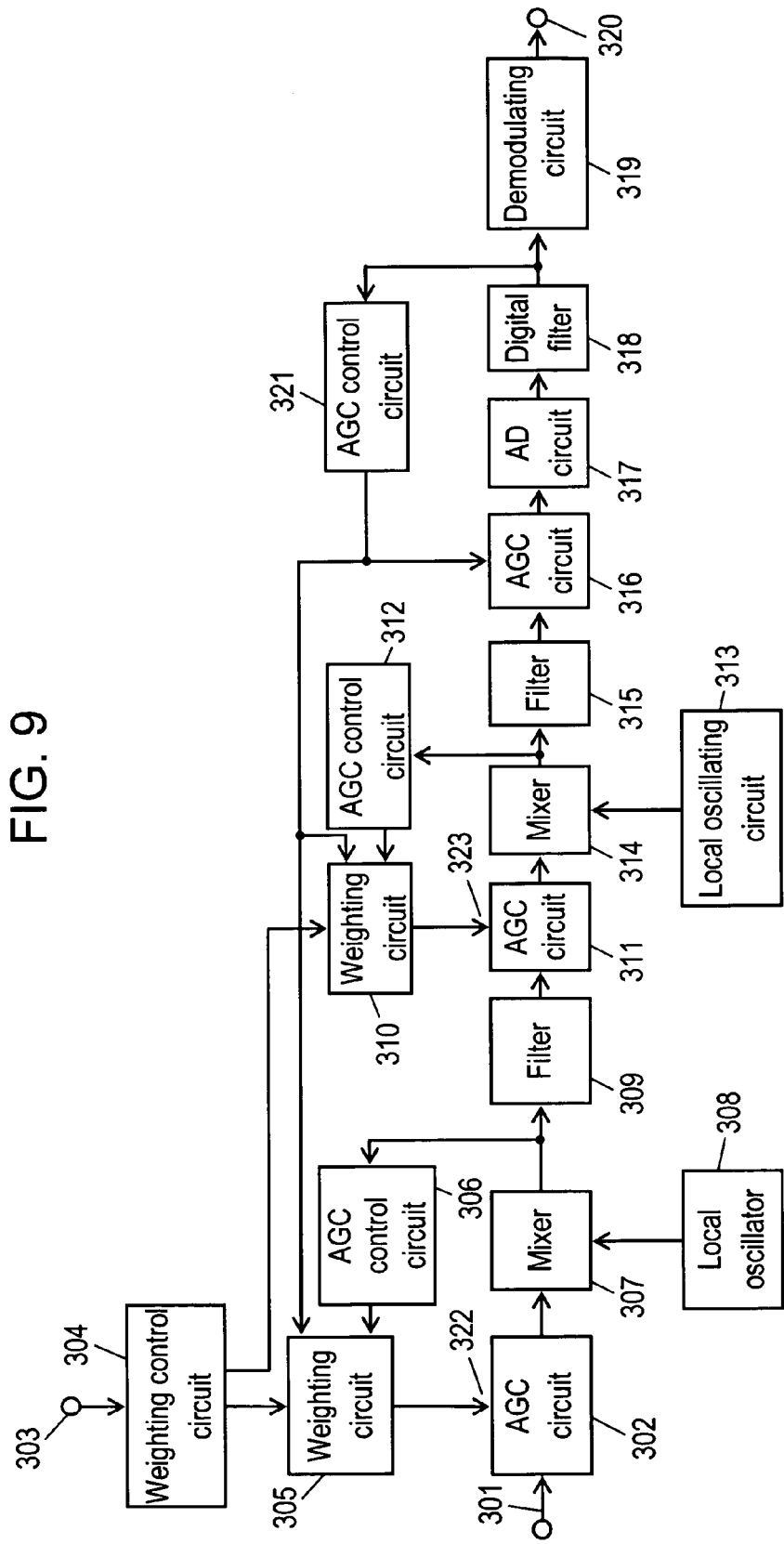
FIG. 9 is a block diagram of a radio-frequency signal receiver in accordance with a sixth exemplary embodiment.

FIG. 9 is a block diagram illustrating a radio-frequency signal receiver in accordance with the sixth embodiment. In FIG. 9, similar elements to those in FIG. 1 and FIG. 3 have the same reference marks, and those elements are not detailed here.

Tuner 22 has the following structure: Input terminal 301 receives a radio-frequency signal, which is supplied to radio-frequency amplifier 302 that is used as an example of the AGC circuit.

Mixer 307 receives an output from amplifier 302 at its first input terminal, and its second input terminal receives an output from local oscillating circuit 308. Filter 309 receives an output from mixer 307. AGC control circuit 306 receives an output from mixer 307. Intermediate-frequency amplifier 311 receives an output from filter 309, and amplifier 311 is used as an example of the second AGC circuit.

Mixer 314 receives an output from amplifier 311 at its first input terminal, and its second input terminal receives an output from local oscillating circuit 313. Filter 315 receives an output from mixer 314.

Tuner 22 outputs a signal to demodulator 37 which has the following structure: Filter 315 outputs a signal to demodulator-gain controller 316, which then outputs a signal to AD converter 317. AD converter 317 outputs a signal to digital filter 318, which then outputs a signal to demodulating circuit 319. Digital filter 318 also outputs the signal to AGC control circuit 321 that controls the gain of demodulator-gain controller 316.

Weighting circuit 305 receives an output voltage from AGC control circuit 321 and an output voltage from AGC control circuit 306, and supplies its output voltage to gain-control terminal 322 of radio-frequency amplifier 306. Another weighting circuit 310 receives an output voltage from AGC control circuit 321 and an output voltage from AGC control circuit 312, and supplies its output voltage to gain-control terminal 323 of intermediate-frequency amplifier 311.

Output terminal 320 of demodulator 37 is coupled to error corrector 40. This is the same as the first embodiment. Corrector 40 is coupled with output terminal 41 and determiner 45.

Controller 46 is coupled to determiner 45, and outputs a signal to input terminal 303 of weighting control circuit 304, which outputs a signal to first weighting circuit 305 and second weighting circuit 310.

Mixer 307 outputs a first intermediate frequency higher than that of an input signal, and mixer 314 outputs a second intermediate frequency lower than that of the input signal.

An operation of the radio-frequency signal receiver having the foregoing structure is demonstrated hereinafter: When a level of a radio-frequency signal fed into input terminal 301 becomes, e.g., not less than −70 dBm, then the gain of radio-frequency amplifier 302 is controlled, when it is not more than −70 dBm, then the gain of radio-frequency amplifier 311 is controlled. Further, when the level of the radio-frequency signal lowers out of the gain controllable range of amplifier 311, then the gain of radio-frequency amplifier 316 can be controlled.

Input terminal 301 receives, e.g., radio-frequency signals ranging from 90 MHz to 770 MHz. This radio-frequency signal is amplified by radio-frequency amplifier 302, then mixed with an output from local oscillator 308 by mixer 307, and then converted into the first intermediate frequency of e.g., 1200 MHz. Further, this first intermediate frequency is supplied to AGC control circuit 306, and an output from mixer 307 undergoes filter 309, where signals other than the desired signal are suppressed.

An output signal from filter 309 is amplified by intermediate-frequency amplifier 311, then mixed with an output from local oscillation circuit 313 by mixer 314, and converted into the second intermediate frequency of e.g., 4 MHz. Then the second intermediate frequency undergoes filter 315, where signals other than the desired signal are suppressed. AGC control circuit 312 controls the gain of intermediate-frequency amplifier 311.

Further, the second intermediate frequency of 4 MHz is amplified by demodulator-gain controller 316, which outputs a signal to AD converter 317, where the signal is converted into a digital signal. Then digital filter 318 further suppresses signals other than the desired signal, and the desired signal is fed into demodulating circuit 319, where the signal is demodulated and supplied to output form terminal 320.

An output signal from digital filter 318 is supplied to AGC control circuit 321. An output voltage from AGC control circuit 321 is supplied to demodulator-gain controller 316. As such, the gain is controlled such that the level of the input signal fed into demodulating circuit 319 becomes constant.

Controller 46 supplies a controlling data to data-input terminal 303, and the data is then supplied to a weighting coefficient of weighting circuit 305 and another weighting circuit 310 via weighting-control circuit 304. The weighting coefficients of circuits 305 and 310 are independently prepared. This preparation allows changing the weighting, if necessary, to an interference signal level of an adjacent channel (an output from AGC control circuit 306) and a desired signal level (an output from AGC control circuit 321). The levels of signals from mixers 307 and 314 are thus set at any value.

The following two voltages can be thus weighted independently:

(1) an output voltage from AGC control circuit 306 to which the desired signal level and the signal level of the adjacent channel are supplied (This voltage is called hereinafter VAGC1.)

(2) an output voltage from AGC control circuit 321 to which only the desired signal is supplied because filters 309, 315, and digital filter 318 suppress substantially the signal levels of the adjacent channel (This voltage is called hereinafter VAGC3.)

The foregoing mechanism allows determining respective contributions of the desired signal level and the signal level of the adjacent channel to a level of an output signal from mixer 307.

The following two voltages can be also weighted independently:

(1) an output voltage from AGC control circuit 312 to which the desired signal level and the signal level, suppressed by filter 309, of the adjacent channel, are supplied (This output voltage is called hereinafter VAGC 2.)

(2) VAGC3

This mechanism allows determining respective contributions of the desired signal level and the signal level of the adjacent channel to a level of an output signal from mixer 314.

In this case, the following voltages are set at 3V with max. gain and at 0V with min. gain: VAGC 1, VAGC2, VAGC3, an output voltage from weighting circuit 305 (VAGC0), and an output voltage from weighting circuit 310 (VGCA0').

Weighting coefficients of respective weighting circuits 305, 310 can be independently set within the range from 0 to 1. For instance, in the case, where the coefficient of circuit 305 is 1, and that of circuit 310 is any number, the following operation is take place: When a radio-frequency signal level fed into input terminal 301 is not less than −70 dBm, gain-control works in radio-frequency amplifier 302, and when it is not more than −70 dBm, gain-control in intermediate-frequency amplifier 311 works. Further, when it is not more than −90 dBm, gain-control in demodulator-gain controller 316 works.

A level of an interference signal of, e.g., an adjacent channel, is negligibly small with respect to a desired signal level, and the desired signal of not more than −90 dBm can control a gain of the demodulator. Thus VAGC1 becomes 3V so that the gain becomes the max. VAGC 3 changes between 0V and 3V to cover the min. gain through the max. gain, and VAGC0 becomes 3V because it cannot be more than 3V. VAGC2 becomes 3V, and VAGC3 changes between 0V and 3V. VAGC0' becomes 3V because it cannot be more than 3V.

Next, the following case is described: a level of interference signal such as an adjacent channel is small with respect to a level of desired signal, and the level of desired signal ranges between −70 dBm and −90 dBm. In this case, the gain is controlled by this desired signal, and VAGC1 is controlled at 3V to get the max. gain. VAGC3 changes from 0V through 3V VAGC0 becomes 3V because it cannot exceed 3V. The gain is controlled by VAGC2 which is between 0V and 3V. VAGC3 can be neglected because it becomes 0V. VAGC0' is determined by VAGC2.

Figure 10:
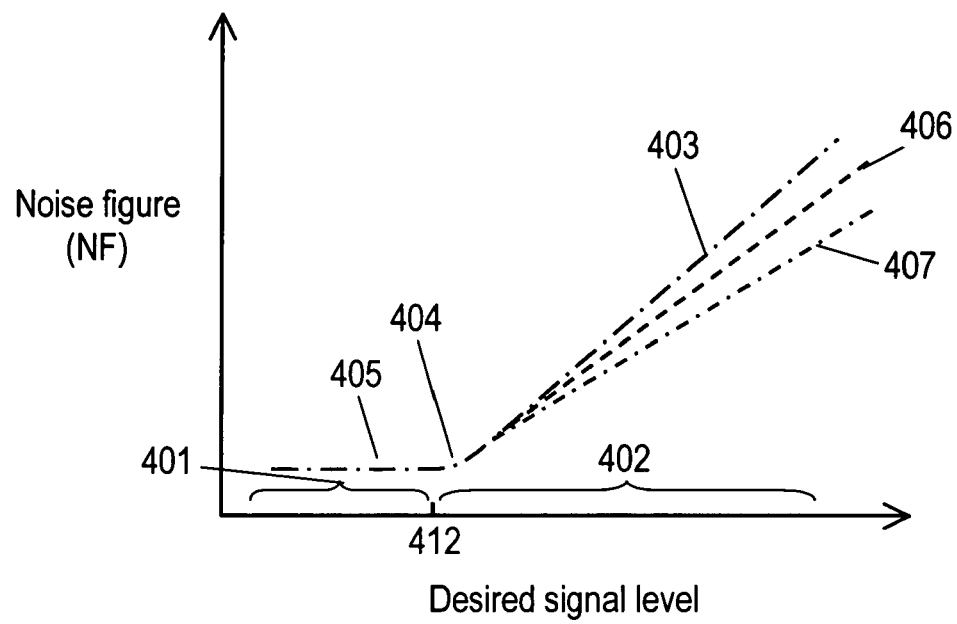
FIG. 10 shows characteristics of the radio-frequency signal receiver in accordance with the sixth exemplary embodiment.

FIG. 10 shows NF (noise factor) of the radio-frequency signal receiver with respect to an input signal level. In FIG. 10, horizontal-axis indicates signal levels (dBm), and vertical-axis indicates NF (dB) of the radio-frequency signal receiver.

Point 412 indicates a signal level of −70 dBm. In area 401 of input signal level, where a desired signal level is not more than −70 dBm, radio-frequency amplifier 302 produces the max gain, and the NF of amplifier 302 becomes predominant, so that NF 405 of constant and low level takes place.

Figure 11:
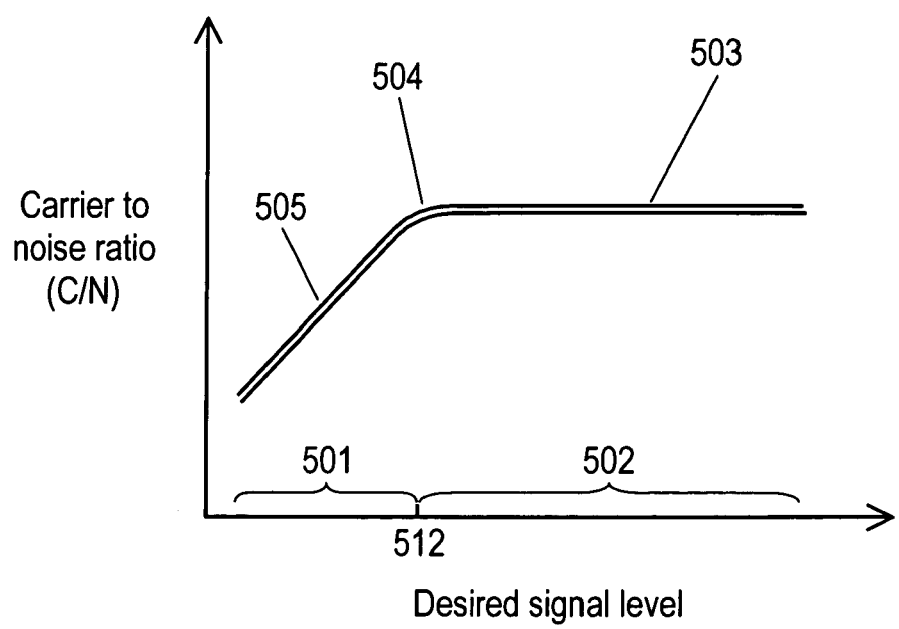
FIG. 11 also shows characteristics of the radio-frequency signal receiver in accordance with the sixth exemplary embodiment.

FIG. 11 shows a ratio of carrier-wave vs. noise (C/N) with respect to a desired signal level. In FIG. 11, horizontal-axis indicates a desired signal level (dBm), and vertical-axis indicates C/N of the radio-frequency signal receiver. Point 512 indicates a desired signal level of −70 dBm.

In lower-level area 501, where the level of the desired signal is not more than −70 dBm, the desired signal level with respect to NF 405 of low and constant level is greater than that shown in FIG. 10. Thus C/N becomes better in response to the desired signal level. Line 505 indicates this situation.

The next case is this: A level of an interference signal such as an adjacent channel is low with respect to a desired signal level, which is not less than −70 dBm. In this case, C/N of the radio-frequency signal receiver is described hereinafter. The gain is controlled by the desired signal level of not less than −70 dBm. VAGC1 thus changes, for example, from 0V to 3V so that the gain can change from max. to min. VAGC2 becomes 0V, i.e., min. gain, so that it can be neglected. As a result, VAGC0 is determined by only VAGC1, and the gain of amplifier 302 is controlled.

On the other hand, for intermediate-frequency amplifier 311, VAGC2 is controlled to be 0V so that the gain becomes the minimum. VAGC0' is thus controlled its gain by only VAGC1. To be more specific, as shown in FIG. 10, in greater-level area 402 where an input signal is at the level of not less than −70 dBm, the gain is controlled such that amplifier 302 produces min. gain. Therefore, respective NFs of mixer 307, filter 309 and the circuits on ward cannot be neglected any longer, and NF of the radio-frequency signal receiver increases gradually as line 403 indicates.

In greater-level area 502 shown in FIG. 11, where the level of the desired signal is not less than −70 dBm, the desired signal level increases. On the other hand, NF of the receiver degrades by approx. the same amount in area 502. As a result, C/N shows a constant value 503.

Next, the following case is described: The desired signal level is constant at e.g., −70 dBm, and a signal level of the adjacent channel is not more than −70 dBm. C/N of the radio-frequency signal receiver under this condition is described below:

In this case, the gain is controlled by the desired signal level of −70 dBm. Thus when the desired signal level is at −70 dBm, VAGC1 is controlled at 3V so that the gain becomes maximum. VAGC3 is controlled at 0V so that the gain becomes zero (0), and it can be neglected. As a result, VAGC1 is a control voltage of amplifier 302, and the gain is controlled accordingly. For intermediate-frequency amplifier 311, VAGC2 is controlled at 0V so that the gain becomes minimum, and VAGC3 is controlled at 0V so that the gain becomes minimum, thus VAGC0' becomes 0V.

In other words, NF of the receiver stays low as point 404 in FIG. 10 shows, and C/N of the receiver stays in a good condition as line 504 in FIG. 11 shows.

Figure 12:
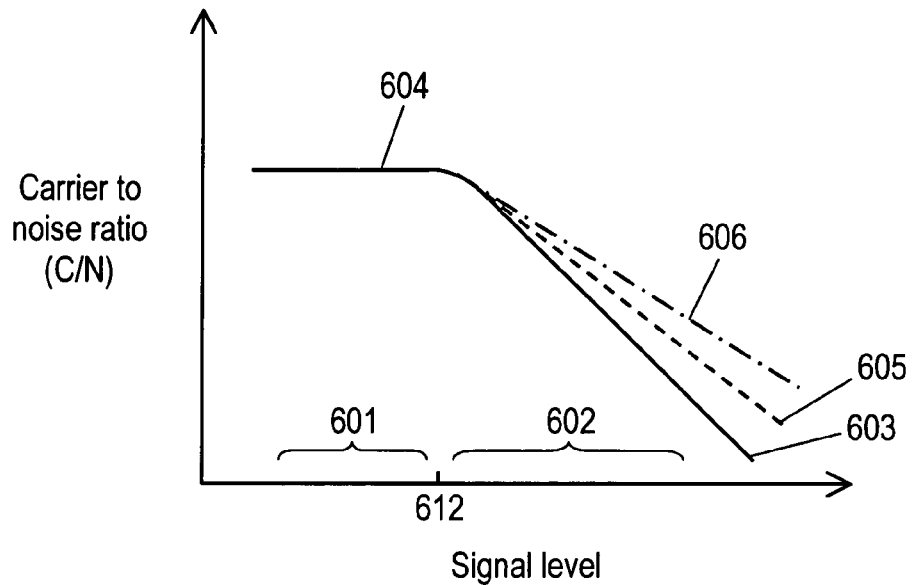
FIG. 12 also shows characteristics of the radio-frequency signal receiver in accordance with the sixth exemplary embodiment.

FIG. 12 shows C/N of the radio-frequency signal receiver with respect to a signal level of an adjacent channel when the desired signal level is at −70 dBm. In FIG. 12, X-axis indicates a signal level (dBm) of the adjacent channel, and Vertical-axis indicates C/N. Point 612 shows signal level of −70 dBm of the adjacent channel. In area 601, where the signal level of the adjacent channel is lower than −70 dBm, the control by the desired signal level of −70 dBm is predominant, therefore, the C/N of the receiver shows an excellent status as line 604 shows. In other words, the signal level of the adjacent channel is lower than the desired signal level, so that this status does not adversely influences the receiving condition.

Next, the following case is described: The desired signal level is constant at e.g., −70 dBm, and a signal level of an adjacent channel is not less than −70 dBm. The C/N of the radio-frequency signal receiver under this condition is described below:

In this case, the gain of radio-frequency amplifier 302 is by VAGC1 which is controlled, e.g., between 0V and 3V in order to cover the max. gain through the min. gain in response to the adjacent-channel signal level greater than the desired signal level. Amplifier 302 thus outputs both of the adjacent-channel signal level which is gain-controlled and the smaller desired signal level. The adjacent-channel signal level; however, is almost removed by filters 309, 315 and digital filter 318 that is excellent in suppressing useless signals. As a result, only the smaller desired signal level is detected by AGC control circuit 321. VAGC3 thus outputs a nearby 3V, i.e., change the gain as close as the max. gain for the small desired signal level.

As discussed above, VAGC1 becomes a nearby 0V, i.e., the minimum gain, and VAGC3 outputs a nearby 3V, i.e., the maximum gain. VAGC0 can be thus corrected toward the max. gain by setting respective weighting coefficients appropriately.

Through the foregoing operation, radio-frequency amplifier 302 is controlled its gain by VAGC0 which is corrected toward the max. gain, and amplifier 302 then outputs both of the adjacent-channel signal and the small desired signal. Those signals are fed into intermediate-frequency amplifier 311 via mixer 307 and filter 309. The adjacent-channel signal is somewhat suppressed by filter 309.

VAGC2 is controlled from e.g., 3V to 0V in response to the adjacent-channel signal greater than the desired signal so that the gain changes from the maximum to the minimum. Intermediate-frequency amplifier 311 thus outputs both of the adjacent-channel signal gain-controlled and the small desired signal.

The adjacent-channel signal supplied from amplifier 311 is; however, almost removed by filter 315 and digital filter 318 that is excellent in suppressing useless signals. As a result, only the smaller desired signal in response to the level of the adjacent-channel signal is detected by AGC control circuit 321. VAGC3, namely, the output voltage from AGC control circuit 321 becomes a nearby 3V, i.e., the max. gain.

VAGC2 thus stays somewhere between 0V and 3V depending on the signal level of the adjacent channel, and VAGC3 is output as a nearby 3V corresponding to the max. gain. VAGC0' can correct the gain toward the max. gain by setting respective weighting coefficients of weighting circuit 310 to VAGC2 and weighting circuit 310 to VAGC3 appropriately.

In this case, if the weighting coefficient of circuit 310 is set excessively greater than that of circuit 305, VAGC0 becomes great more than necessary, so that the gain of radio-frequency amplifier 302 increases too much. Therefore, the respective weighting coefficients are desirably set not to produce interference due to third inter-modulation distortion (IM3) in mixer 307.

In weighting circuit 310, if weighting coefficient for VAGC3 is set excessively greater than that for VAGC2, weighting circuit 310 outputs VAGC0' at an excessively great value, so that the gain of intermediate-frequency amplifier 311 becomes more than necessary. Therefore, the respective weighting coefficients are desirably set not to produce interference due to third inter-modulation distortion (IM3) in mixer 314.

As discussed above, in the case when the adjacent-channel signal level is greater than the desired signal level, the gain of radio-frequency amplifier 302 is corrected toward the maximum, and the NF of amplifier 302 decreases. As a result, the NF of the radio-frequency signal receiver is improved.

As shown in FIG. 10, in area 402 where an input signal level is not less than −70 dBm, the NF shown by line 406 is improved from conventional curve 403. The C/N of the receiver also improved corresponding to the improved amount of NF. This improvement of C/N is shown with line 605 shifted from line 603 which indicates a conventional C/N.

Further, the gain of intermediate-frequency amplifier 311 is corrected toward the max. gain, so that NF of the receiver is improved. As shown in FIG. 10, in area 402 where input signal level is not less than −70 dBm, NF is indicated with line 407, which is further improved from conventional NF 406. In other words, C/N of the receiver is improved corresponding to the improvement of NF. This improvement of C/N is shown with curve 606 in FIG. 12. C/N with only one weighting circuit 305 is shown with curve 605, and curve 605 proves further improvement of C/N shown with curve 606.

Data terminal 303 receives an output from controller 46, so that weighting control circuit 304 is controlled by a control data supplied from controller 46. The weighting coefficient of weighting circuit 305 is thus independently set by controller 46. As a result, an optimum gain can be obtained to respective channels.

As discussed above, in the case when a great interference signal exists in an adjacent channel to a desired signal, radio-frequency amplifier 302 is controlled its gain by VAGC0 based on the data supplied from controller 46. This structure allows providing the radio-frequency signal receiver with improved C/N and stabilized receiving status. The foregoing VAGC0 is an output voltage V from weighting circuit 305 in the case when the desired signal level and the adjacent-channel signal are multiplied by the weighting coefficient.

In this sixth embodiment, in addition to the foregoing gain control, another improvement is carried out, namely, a signal of a bit-error rate is detected, and a voltage for controlling the gain of radio-frequency amplifier 302 is changed by the CPU, so that an interference signal of an adjacent channel is improved. This improvement further enhances the optimum gain control over radio-frequency amplifier 302, and improves the interference signal of the adjacent channel. As a result, a stable receiving condition is obtainable during movement of a mobile apparatus, in which a receiving condition changes momentarily. In the foregoing discussion, the signal of bit-error rate is detected; however, C/N of demodulating circuit 319 can be detected instead.

In this sixth embodiment, the case, where a frequency supplied from mixer 307 is higher than that of an input signal, is described; however, a similar description can be applied to the contrary case, i.e., the output frequency from mixer 307 is higher than the input signal frequency. Instead of using mixer 314, a direct conversion method can be employed with similar advantages.

According to the sixth embodiment, a first weighting circuit weights and composites an output voltage from a first AGC control circuit and an output voltage from a second AGC control circuit such that the numbers of errors received decreases. The gain control over the AGC control circuits is prepared in an optimum manner with respect to C/N and IM3. This structure allows the radio-frequency signal receiver to have an excellent bit-error rate even if interference from the adjacent channel exists.

Use of a gain-controlling voltage over a second AGC circuit controls the gain of the first AGC circuit appropriately, where this voltage is responsive to an interference signal level of the adjacent channel. This mechanism improves the bit-error rate against the interference signal of the adjacent channel. As a result, a stable receiving condition can be maintained while the receiver is moving.

Further, a second weighting circuit weights respective output voltages supplied from the second AGC circuit and a third AGC circuit, thereby controlling the gain of the second AGC circuit. Therefore, an appropriate preparation of the weighting coefficient of the second AGC circuit improves C/N and IM3. This advantage further improves the bit-error rate against the interference from the adjacent channel, so that the better radio-frequency signal receiver is obtainable.

Data can be supplied through an external data-input terminal, so that the weighting coefficient can be changed upon request. This feature allows controlling respective channels to obtain an appropriate gain respectively.

Exemplary Embodiment 7

Figure 13:
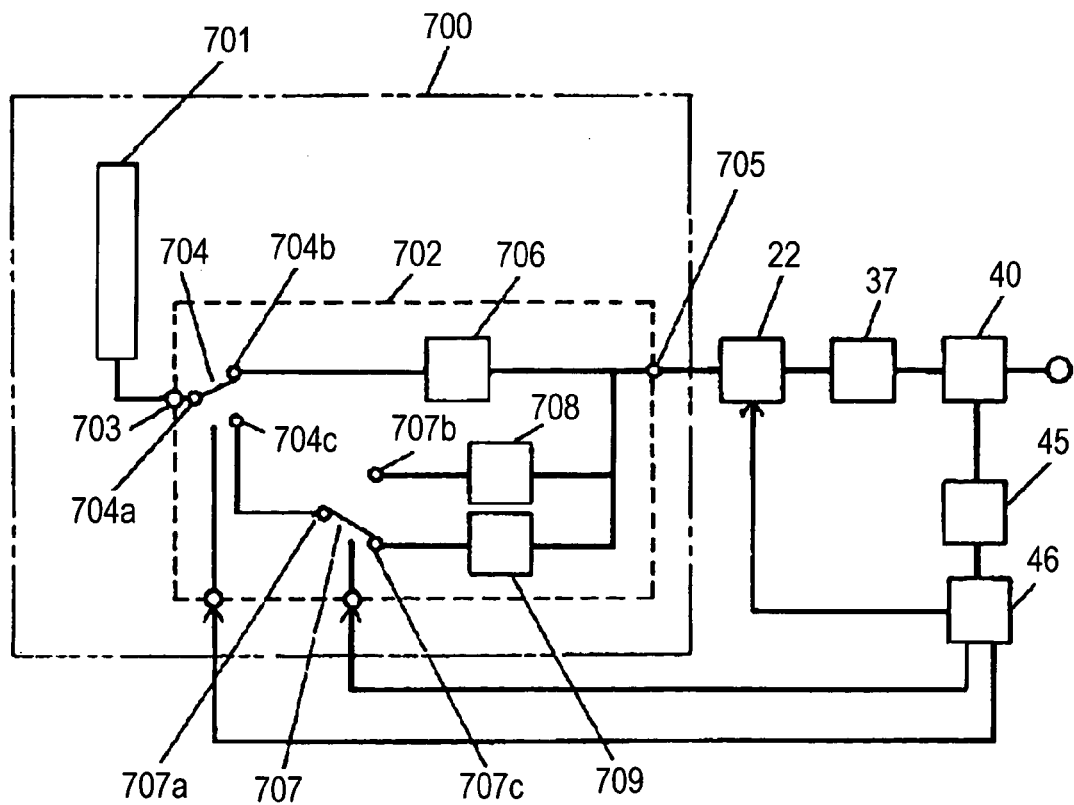
FIG. 13 is a block diagram of a radio-frequency signal receiver in accordance with a seventh exemplary embodiment.

A radio-frequency signal receiver in accordance with the seventh embodiment is demonstrated hereinafter with reference to an accompanying drawing. FIG. 13 is a block diagram illustrating an antenna section in accordance with the seventh embodiment. In FIG. 13, antenna section 700 includes rod-antenna 701 having a length of 40 mm and matching unit 702 that receives an output from antenna 701.

Input terminal 703 of matching unit 702 is coupled to common terminal 704a of switch 704. Between a first terminal 704b of switch 704 and output terminal 705, UHF matching unit 706 is interposed. Second terminal 704c of switch 704 is coupled with common terminal 707a of switch 707. Between first terminal 707b of switch 707 and output terminal 705, VHF high-band matching unit 708 is interposed. Between second terminal 707c of switch 707 and output terminal 705, VHF low-band matching unit 709 is interposed.

Controller 46 outputs a signal to those switches 704 and 707. To be more specific, for receiving a channel of respective bands, controller 46 turns on the switch of the matching unit corresponding to a desired frequency. This operation realizes impedance-matching to respective frequency-bands. However, it is difficult to provide every receivable channel with perfect impedance matching, so that the channels out of matching are obliged to lose signal components and degrade NF.

For those channels out of matching, controller 46 boosts the gain of the high-frequency amplifier or the intermediate-frequency amplifier used in the fifth or sixth embodiment in response to the loss due to the matching unit, so that the radio-frequency signal receiver with a better NF is obtainable.

Exemplary Embodiment 8

Figure 14:
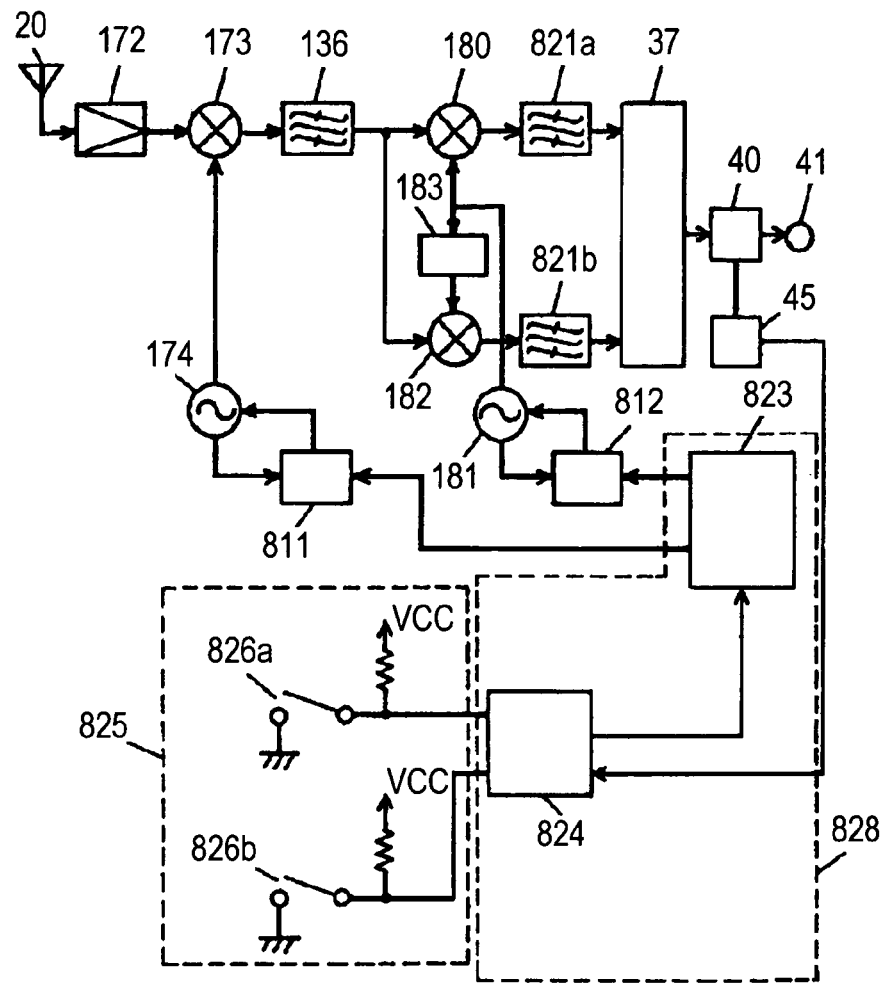
FIG. 14 is a block diagram of a radio-frequency signal receiver in accordance with an eighth exemplary embodiment.

The eighth embodiment is demonstrated hereinafter with reference to accompanying drawings. FIG. 14 is a block diagram illustrating a radio-frequency signal receiver in accordance with the eighth embodiment, in which dealing with variations in a frequency-pass band of SAW filter 136 is described.

Antenna 20 receives a terrestrial digital broadcasting signal including a signal, in which frequencies of one channel divided into 7 segments are included. Antenna 20 is capable of receiving frequencies ranging from approx. 90 MHz to approx. 770 MHz. In this frequency band, analog TV signals and digital TV signals that are interposed between the analog TV signals are arranged.

Radio-frequency amplifier 172 is coupled to antenna 20, and amplifies the signal received by antenna 20. Amplifier 172 is thus wide-band amplifier. Mixer 173 receives an output from amplifier 172 at its first input terminal, and its second input terminal receives an output from local oscillator 174, and mixer 173 outputs a first intermediate frequency. The first intermediate frequency is set at as high as approx. 1205 MHz, this is approx. 1.5 times higher than the max. frequency of the input signal. This high intermediate frequency makes it hard to produce interference caused by harmonics distortion on broadcasting signals or interference from cellular phones.

SAW filter 136 receives an output from mixer 173. SAW filter 136 is used as an example of narrow-band filter. The center frequency of filter 136 is approx. 1205 MHz and the pass band is approx. 1.6 MHz. Since the center frequency of SAW filter 136 is set at such a radio frequency, the pass band has great dispersion.

Mixers 180 and 182 receive an output from SAW filter 136 at their first input terminals, and their second input terminals receive an output from local oscillator 181. Those mixers output two second intermediate-frequencies of approx. 500 kHz, these two frequencies differs 90 degrees in phase from each other. Mixers 180 and 181 thus output directly I and Q signals.

Low-pass filter (LPF) 821a, 821b receive outputs from mixers 180, 182, and have pass-band of approx. 429 kHz so that the signals in only one segment can pass through. LPF 821a, 821b are formed of chip-capacitors and chip-inductors. Demodulator 37 receives outputs from LPF 821a, 821b. Demodulator 37 OFDM-demodulates I and Q signals from LPF 821a, 821b, then obtain digital signals.

Error corrector 40 receives an output from demodulator 37, and outputs a signal to terminal 41. Error corrector 40 is formed of Viterbi corrector 42 that receives the output from demodulator 37, and Reed-Solomon corrector 43 that receives an output from Viterbi corrector 42.

If an interference wave exists in the receiving frequency band, error corrector 40 cannot correct an output signal to make the signal's bit-error rate zero (0). Original information thus cannot be reproduced correctly, so that an interference signal is desirably attenuated in order to prevent the bit-error rate from increasing.

PLL data transmitter 823 transmits data to PLL circuit 811 loop-coupled to local oscillator 174 and PLL circuit 812 loop-coupled to local oscillator 181.

Controller 824 is coupled to PLL data transmitter 823 and receives an output from memory 825. Controller 824 sends data to PLL data transmitter 823 in response to data stored in memory 825 in order to change the first intermediate frequency from the given frequency of approx. 1205 MHz.

In this eighth embodiment, PLL data transmitter 823 and controller 824 are accommodated in one CPU 828, so that the radio-frequency signal receiver can be downsized.

Memory 825 has switches 826a, 826b, and the on-off status of those switches provides four status to be stored. Switches 826a and 826b are formed of conductive pattern on a printed board. A cut of the conductive pattern allows the memory to store the status, so that the memory does not lose its content even a power failure of long-hour or a thunderbolt happens.

Determiner 45 is interposed between controller 824 and error corrector 40, and instructs controller 824 to change the data of PLL data transmitter 823 when it determines the bit-error rate exceeds 0.0002.

An operation of the radio-frequency receiver of the eighth embodiment is demonstrated hereinafter, i.e., in the case when SAW filter 136 has frequency-dispersion in its pass band.

Figure 15:
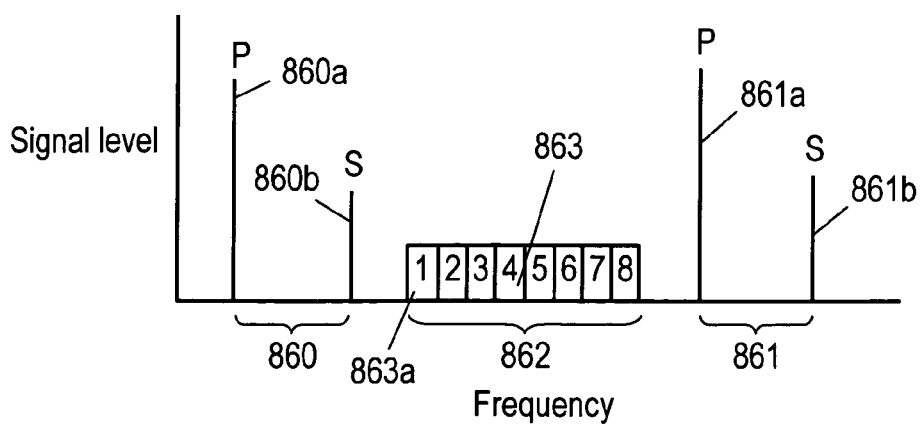
FIG. 15 shows an outline of frequency characteristics of a signal fed into a radio-frequency signal receiver in accordance with the eighth exemplary embodiment of the present invention.

When the first intermediate frequency is fixed at a certain value, an analog broadcasting wave in the adjacent channel sometimes cannot be attenuated because of the dispersion of SAW filter 136. To be more specific, as shown in FIG. 15, antenna 20 receives simultaneously a edge segment 863a of terrestrial digital broadcasting signal 862 and analog TV broadcasting signal 860. In such a case, PLL data transmitter 823 shifts an oscillation frequency of local oscillator 811 a little, and the first intermediate frequency shifts a little.

For instance, signal levels of segment 863a and audio-signal 860b of analog broadcasting signal 860 can be monitored with an output from SAW filter 136. When the level of audio-signal 860b is attenuated to a given level, one of switches 826a or 826b is cut off for storing the status based on the frequency-shift amount in accordance with the predetermined classes in controller 824. The storing sometimes does not need the cut-off.

Figure 16A:
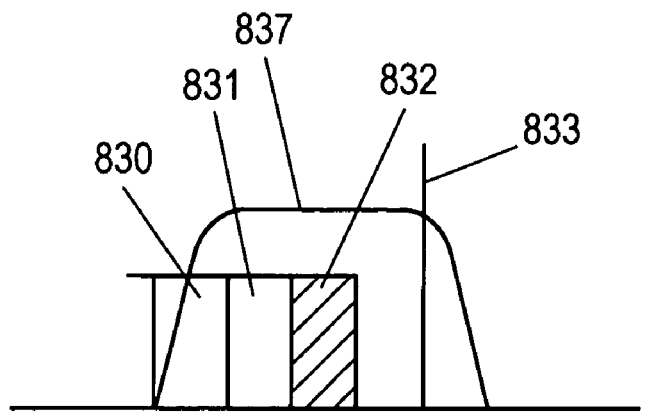
FIGS. 16A, 16B, and 16C show frequency characteristics when an intermediate frequency of a radio-frequency signal receiver shifts.
Figure 16B:
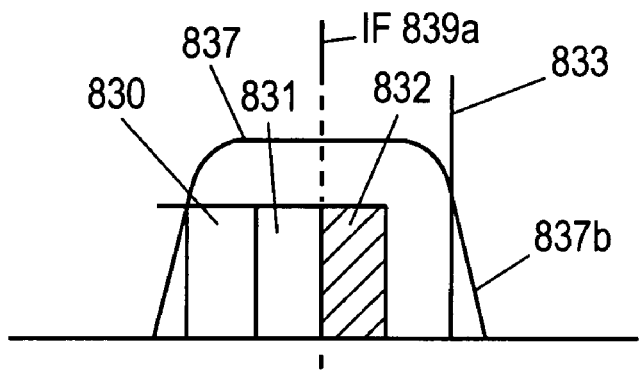
Figure 16C:
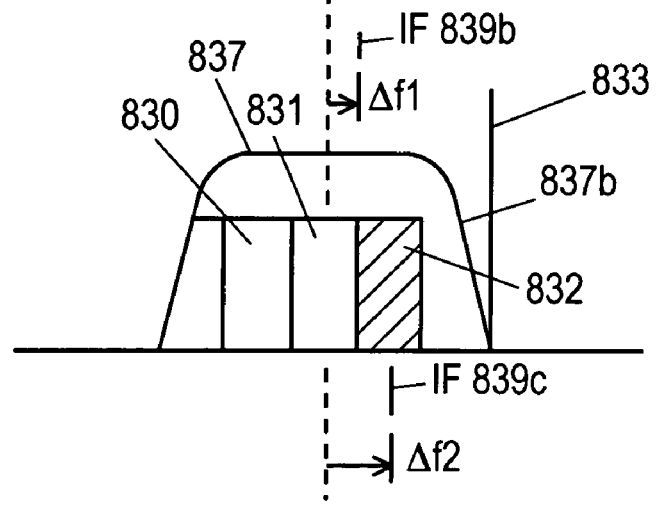

FIGS. 16A, 16B and 16C show an example of shifting the first intermediate frequency. In those FIGS., horizontal-axis indicates a frequency and vertical-axis indicates a signal level. FIG. 16A illustrates a status where segment 832 is tuned, and the first intermediate frequency is set at frequency 839a (e.g. 1205 MHz). In this status, because carrier wave 833 of the adjacent analog broadcasting is within pass-band 837 of SAW filter 136, carrier wave 833 cannot be attenuated.

FIG. 16B illustrates a status where segment 382 is tuned, and the first intermediate frequency is shifted to frequency 839b=frequency 839a+Δf1. In this case, carrier wave 833 of the adjacent analog broadcasting becomes near attenuation band 837b; however, it is not yet sufficiently attenuated.

FIG. 16C illustrates a status where the first intermediate frequency is further shifted to frequency 839c=frequency 839a+Δf2. In this case, because carrier wave 833 of the adjacent analog broadcasting is within attenuation band 837b, carrier wave 833 can be attenuated. The shifted amount of Δf2 changes in response to the dispersion of the pass band of SAW filter 136.

FIG. 18 is a logic table in accordance with the eighth embodiment, and shows an example of a status predetermined by Δf2 and cut-off of switches 826a, 826b. Frequency-shift monitored as discussed above is expressed with Δf2, which varies depending on the dispersion of the monitored pass-band frequency of the SAW filter.

Switches 826a, 826b establish the range of Δf2 in advance, and determine a logic for the respective ranges of Δf2. Shift amount of the frequency is determined in advance for the respective logic statuses of switches 826a, 826b, and the shift amount is expressed with Δf3.

Controller 824 instructs the PLL data transmitter to shift the frequency by the amount of Δf3. The way of the instruction is, e.g., that CPU etc. changes PLL data of PLL data transmitter 823, based on the digital data from controller 824. For example, assume that Δf2=170 kHz, then switch 826a is turned to logic "0", and the pattern of switch 826b is cut off in order to make switch 826b logic "1". As such, the status is stored in memory 825.

When the radio-frequency signal receiver receives a terrestrial digital broadcasting, controller 824 instructs the frequency to be shifted by the amount of Δf3=150 kHz. PLL data transmitter 823 controls an oscillating frequency of local oscillator 181 such that the first intermediate frequency becomes 1205 MHz+150 kHz. At this time, based on the instruction from controller 824, i.e., shift amount of 150 kHz, PLL data transmitter 823 shifts the oscillation frequency of oscillator 181 by 150 kHz. This operation also stabilizes the outputs from mixers 180, 182, namely, the second intermediate frequency, at a constant value.

FIGS. 17A, 17B, and 17C show the status shown in FIG. 16C using the following three SAW filter pass-bands and examples of setting the first intermediate frequency. In FIGS. 17A, 17B, and 17C, horizontal-axis indicates a frequency and vertical-axis indicates a signal level.

In FIG. 17A, first intermediate-frequency 839d is set when an input to controller 824 is e.g., a digital signal (0, 1). In FIG. 17B, first intermediate frequency 839e is set when an input to controller 824 is e.g., a digital signal (1, 0). In FIG. 17C, first intermediate frequency 839f is set when an input to controller 824 is e.g., a digital signal (0, 0).

In this eighth embodiment, memory 825 stores the status by cutting the pattern, and other memory devices using electrical or magnetic medium can be used for storing the status. In such a case, a user can rewrite the content of the memory after the user purchases a radio-frequency signal receiver. Therefore, for instance, during a channel-search, segment 863a or the signal level of audio signal 860b of the analog broadcasting signal can be monitored with the output from SAW filter 136 or determiner 45. This monitor-information can be stored in memory 825 depending on the result.

The above structure allows controlling the frequency of interference wave to be always within the attenuation band of SAW filter 136 regardless of the dispersion of the pass-band frequency of SAW filter 136. The interference wave is thus attenuated in a greater amount, so that a low pass filter of small attenuation capacity instead of a SAW filter can be used after the second mixer. As a result, the radio-frequency signal receiver can be downsized and reduced its cost.

According to this embodiment, a shifted amount of the frequency in response to a segment, where interference occurs, can be stored in the memory, and to be more specific, an appropriate shifted amount of each segment can be stored. An optimum first intermediate frequency for each segment is set, so that the analog TV broadcasting signal can be set within an attenuation band of a narrow-band SAW filter.

According to this embodiment, since the determination is done with a bit-error rate, controller 824 only send the data about shifted frequencies to PLL data transmitter 823 based on the determination result of the determiner. This advantage saves an additional circuit for detecting a level of an interference signal, so that the radio-frequency signal receiver can be inexpensive.

In the case where the narrow-band filter has temperature characteristics and its pass-band changes depending on a temperature, the frequency of interference wave can be controlled to be within the attenuation band of the SAW filter regardless of the pass-band change due to a temperature. The attenuation wave is thus attenuated in a greater amount, so that a low pass filter of smaller attenuation capacity can be used instead of a SAW filter after the second mixer. As a result, the radio-frequency signal receiver can be downsized and reduced its cost.

In this embodiment, an output from memory 825 is supplied to CPU 828, of which output is supplied to the data terminals of PLL circuits 811 and 812. The respective data terminals of demodulator 37 and CPU 828 can be coupled to each other via a common data bus, so that data can be transmitted and received using this common data bus. Data can be supplied to PLL circuits 811 and 812 via a data output terminal (not shown) of demodulator 37. In such a case, since the common data bus is utilized, wiring for data communication can be simplified, and in this case, demodulator 37 may be coupled to PLL circuits 811 and 812 via the common data bus for data transmission.

Exemplary Embodiment 9

Figure 19:
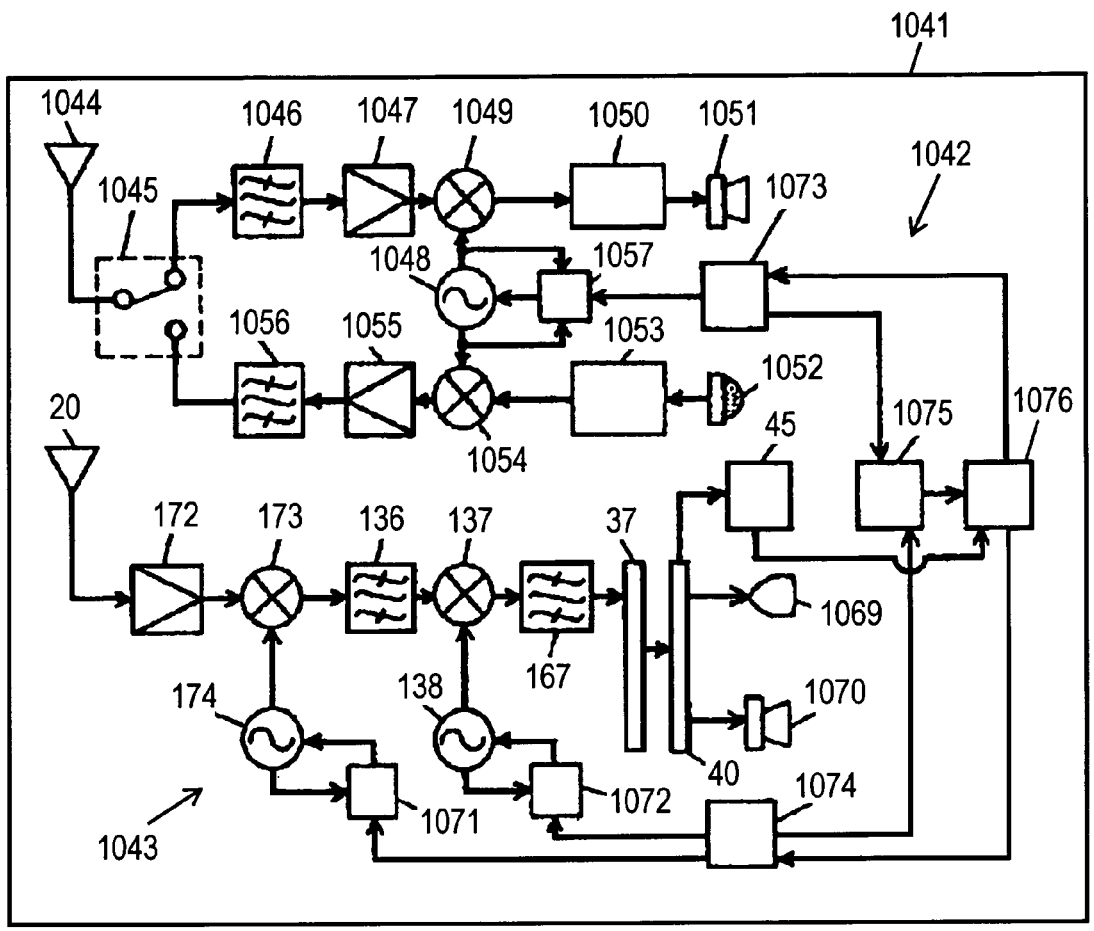
FIG. 19 is a block diagram of a radio-frequency signal receiver in accordance with a ninth exemplary embodiment.

The ninth exemplary embodiment of the present invention is demonstrated hereinafter with reference to accompanying drawings. FIG. 19 is a block diagram illustrating a radio-frequency signal receiver in accordance with the ninth exemplary embodiment.

This receiver is accommodated in one enclosure together with a portable TV and cellular phone 1042, and receives a terrestrial digital broadcasting signal. Cellular phone 1042 is an example of a communication apparatus, and has the following construction:

Antenna switch 1045 is coupled to antenna 1044. SAW filter 1046 is coupled to a first terminal of antenna switch 1045. Low-noise amplifier 1047 receives an output from SAW filter 1046. Mixer 1049 receives an output from low-noise amplifier 1047 at its first input terminal, and its second input terminal receives an output from local oscillator 1048. Demodulator 1050 receives an output from local oscillator 1049. Audio output unit 1051, e.g., a speaker or a receiver, receives an output from demodulator 1050. Audio input unit 1052, e.g., a microphone, converts audio into an electric signal. Modulator 1053 receives an output from audio input unit 1052. Mixer 1054 receives an output from modulator 1053 at its first input terminal, and its second input terminal receives an output from local oscillator 1048. Power amplifier 1055 receives an output from mixer 1054. Low pass filter 1056 is interposed between an output of power amplifier 1055 and a second terminal of antenna switch 1045. PLL circuit 1057 is loop-connected to local oscillator 1048.

Portable TV 1043 has the following structure: Antenna 20 receives a terrestrial digital signal, and radio-frequency amplifier 172 is coupled to antenna 20. Mixer 173 receives an output from amplifier 172 at its first input terminal, and its second terminal receives an output from local oscillator 174. Band pass filter 136 receives an output from mixer 173. Another mixer 137 receives an output from filter 136 at its first input terminal, and its second input terminal receives an output from local oscillator 138. Demodulator 37 receives an output from band-pass filter 167. Error corrector 40 receives an output from demodulator 37 and outputs a signal to video display device 1069 including LCD or CRT. Audio output unit 1070 receives an output signal from error corrector 40. PLL circuit 1071 is loop-connected to local oscillator 174, and PLL circuit 1072 is also loop-connected to local oscillator 138. Band pass filter 167 passes only signals of one segment.

Data generator 1073 is coupled to PLL circuit 1057, and changes frequencies of transmission/reception of cellular phone 1042. Another data generator 1074 is coupled to PLL circuits 1071, 1072, and changes a receiving frequency (a receiving channel) of portable TV 1043.

Data generators 1073, 1074 are coupled to data comparator 1075 for comparing their data with each other. Comparator 1075 outputs a signal to controller 1076.

Controller 1076 supplies data to cellular phone 1042 and portable TV 1043 based on the output signal from data comparator 1075 so that either one of cellular phone 1042 or portable TV 1043 cannot be an interference source. In other words, at least one of oscillating frequencies of local oscillators 1048, 174, 138 is changed a little. A change of the oscillating frequency of local oscillator 174 causes a change of the oscillating frequency of local oscillator 138 for correcting the foregoing frequency-change, so that the second interference frequency can be kept at a constant value (4 MHz).

Error corrector 40 outputs a signal to determiner 45, which outputs a signal to controller 1076. Determiner 45 thus instructs controller 1076 to control respective PLL circuits 1057, 1071, and 1072 when a bit-error rate increases not less than 0.0002.

Figure 20:
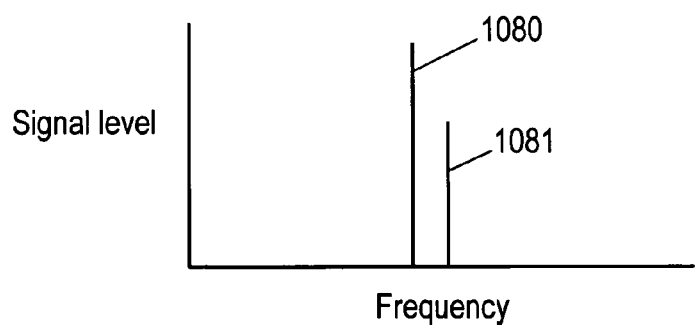
FIG. 20 shows frequency characteristics of a local oscillator for describing operations of a controller in accordance with the ninth exemplary embodiment.

An operation of controller 1076 is demonstrated hereinafter with reference to FIGS. 20 and 21. In those FIGS., horizontal-axis indicates a frequency (MHz), and vertical-axis indicates a signal level (dB).

In the case when cellular phone 1042 has an oscillating frequency close to that of portable TV 1043, both the frequencies interfere with each other. In such a case, either one of the oscillating frequencies of local oscillator 1048 or local oscillator 174 can be changed. Local oscillator 174 shown in FIG. 20 is mainly described here.

Assume that interference wave 1081 exists in the neighborhood of output signal 1080 from local oscillator 174. Interference wave 1081 is caused by the oscillating frequency of local oscillator 1048. Thus the oscillating frequency of oscillator 1048 is changed a little so that the frequency difference between output signal 1080 and interference wave 1081 becomes not less than 10 kHz. This preparation increases a purity of the oscillating frequency of local oscillator 174 disposed in portable TV 1043, thereby increasing the C/N. At the same time, receiving errors can be reduced. Interference wave 1081 occurs in the following cases:

(1) Local oscillator 174 has an oscillating frequency close to that of local oscillator 1048 (the difference is not more than 10 kHz.)

(2) Local oscillator 174 has an oscillating frequency close to an output frequency from power amplifier 1055 (the difference is not more than 10 kHz.) In this case, the oscillating frequency of local oscillator 1048 can be kept as it is, and the oscillating frequency of oscillator 174 per se can be changed a little.

(3) Local oscillator 1048 has an oscillating frequency close to the frequency of a desired channel of portable TV 1043 (the difference is not more than 10 kHz.) In this case, the oscillating frequency of oscillator 1048 is changed a little in order to reduce spurious interference to portable TV 1043.

Figure 21:
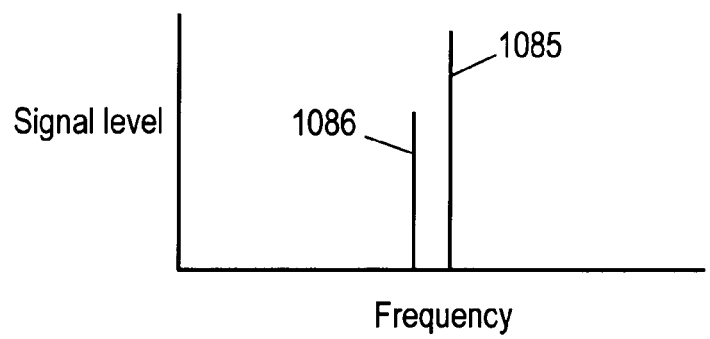
FIG. 21 also shows frequency characteristics of a local oscillator for describing operations of a controller in accordance with the ninth exemplary embodiment.

Next, local oscillator 1048 shown in FIG. 21 is described. Assume that interference wave 1086 exists in the neighborhood of output signal 1085 supplied from local oscillator 1048. Interference wave 1086 is caused by the oscillating frequency of local oscillator 174. Thus the oscillating frequency of oscillator 174 is changed a little so that the frequency difference between output signal 1085 and interference wave 1086 becomes not less than 10 kHz. This preparation increases a purity of the oscillating frequency of local oscillator 1048 disposed in cellular phone 1042, thereby preventing noises from entering into cellular phone 1042 or preventing failure in call in the worst case.

In the case when local oscillator 1048 has an oscillating frequency close to local oscillator 174 (the difference is not more than 10 kHz), interference wave 1086 occurs. Herein, the horizontal axis 1087 indicates frequency (MHz) and the vertical axis 1088 indicates signal level (dB). In the case when local oscillator 174 has an oscillating frequency close to the receiving frequency of cellular phone 1042 (the difference is not more than 10 kHz), the oscillating frequency of oscillator 174 is changed a little in order to reduce spurious interference to cellular phone 1042.

Figure 22:
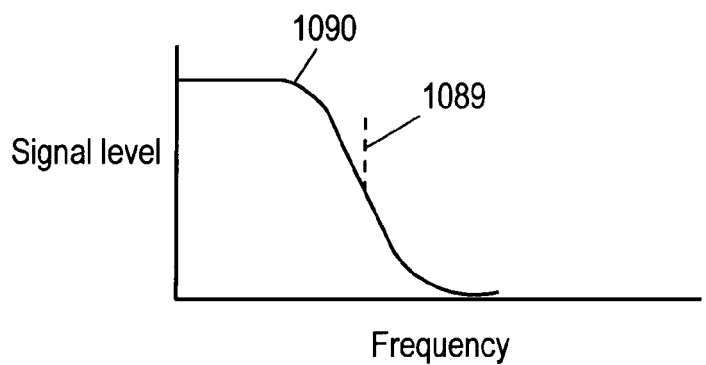
FIG. 22 shows the frequency characteristics of the local oscillator in accordance with the ninth exemplary embodiment.

As discussed above, when interference wave 1081 or 1086 exists in the neighborhood of oscillating frequency 1080 or 1085 respectively, a purity of waveform 1090 is lowered as shown with a dotted line 1089 in FIG. 22. In such a case, therefore, at least one of the oscillating frequency either one of local oscillator 1048 or local oscillator 174 is changed little by little, so that the frequency-purity increases.

The following frequencies of radio waves are used in this ninth exemplary embodiment:

a digital terrestrial signal supplied to antenna 20 of portable TV 1043: VHF band (90 MHz-220 MHz), UHF band (470 MHz-770 MHz)

a frequency used in cellular phone 1042: personal digital cellular (PDC) 1.5 GHz band (1270 MHz-1500 MHz) and wide-band code division multiple access (WCDMNA) band (1920 MHz-2170 MHz)

Figure 23A:
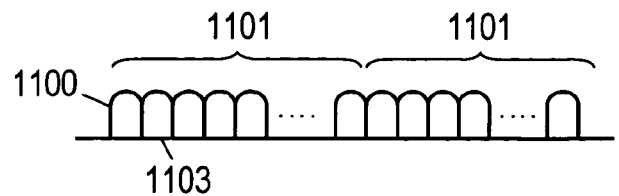
FIGS. 23A, 23B, and 23C show operations of the radio-frequency signal receiver in accordance with the ninth exemplary embodiment.
Figure 23B:
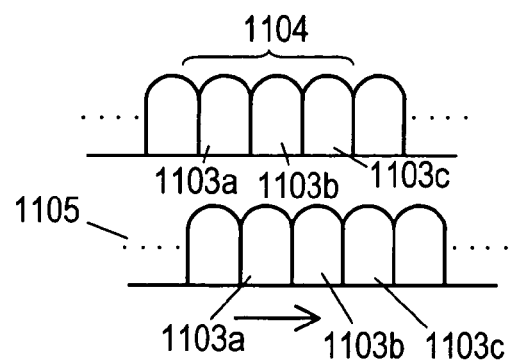
Figure 23C:
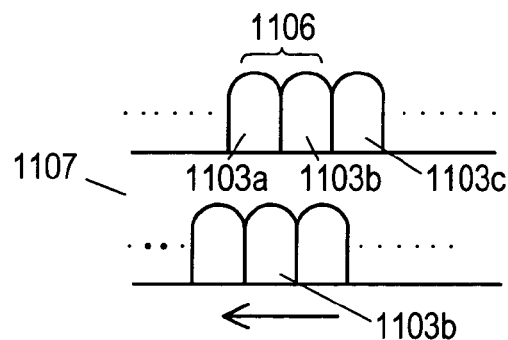

Next, an operation of the radio-frequency signal receiver is demonstrated with reference to FIGS. 23A, 23B, and 23C, where Horizontal-axis indicates a frequency and Vertical-axis indicates a signal level. As shown in FIG. 23A, for instance, one channel 1101 (one channel has a bandwidth of 6 MHz) of digital terrestrial signal 1100 is divided into 13 segments 1103 (one segment has a bandwidth of 428 kHz).

In the VHF band, basically each one of broadcastings is independently transmitted into respective segments 1103. In UHF band, a broadcasting is transmitted into the center segment independent of other segments. Digital terrestrial signal 1100 is converted by mixer 173 into approx. 1205 MHz, i.e., the first intermediate frequency.

As shown in FIG. 23B, band-pass filter 136 having bandwidth 1104 (1.5 MHz) passes generally three segments 1103a, 1103b, and 1103c, where desired wave 1103b is in the center. In this case, the shift of the oscillating frequency of local oscillator 174 by 10 kHz shits the frequencies of segments 1103a, 1103b and 1103c also by 10 kHz respectively as spectrum 1105 shows.

As shown in FIG. 23C, mixer 137 converts the signal into the second intermediate frequency, i.e., approx. 4 MHz. At this time, the first intermediate frequency is shifted by 10 kHz, the second intermediate frequency is shifted inversely by 10 kHz and becomes 4 MHz as spectrum 1107 shows. Band-pass filter 167 having a bandwidth 1106 (428 kHz) passes desired wave 1103b.

Figure 24:
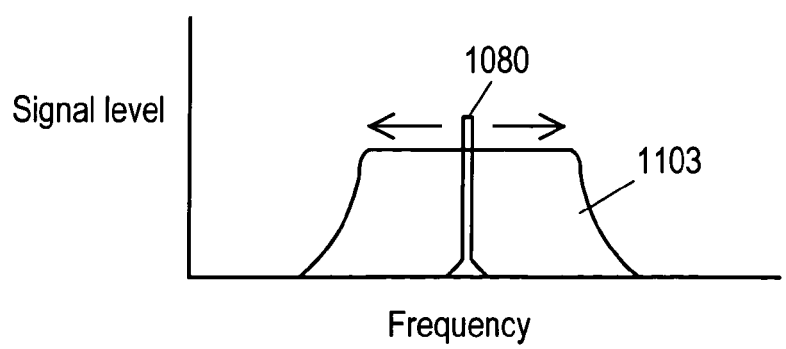
FIG. 24 shows an outline of frequency characteristics of a signal received by the radio-frequency signal receiver in accordance with the ninth exemplary embodiment.
Figure 25:
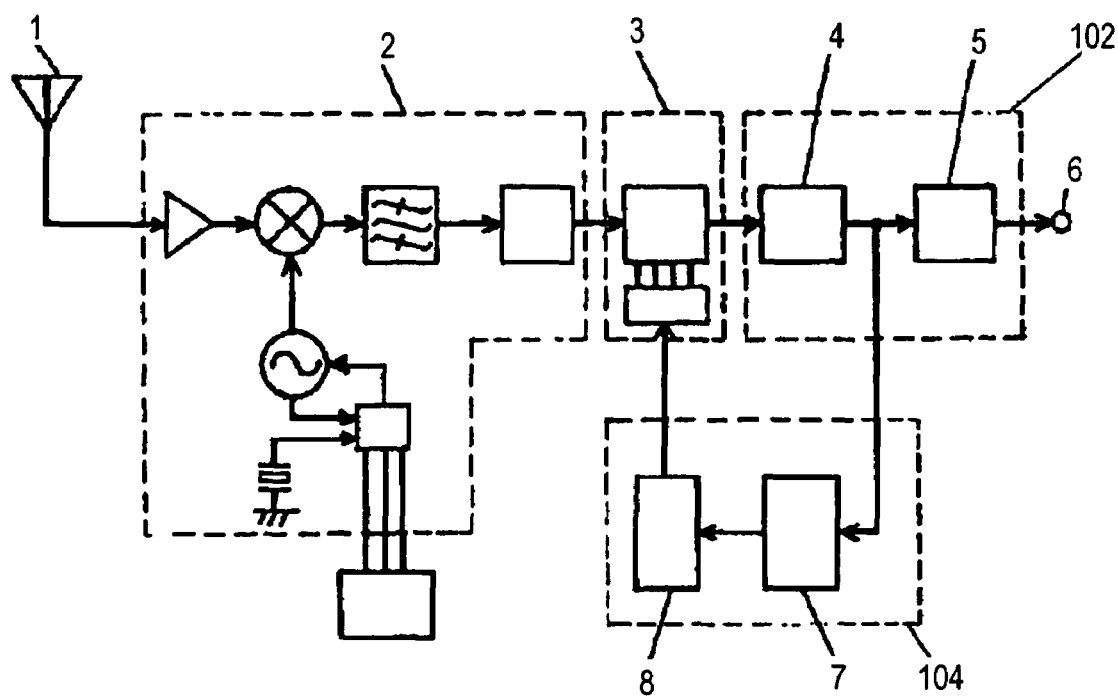
FIG. 25 is a block diagram of a conventional radio-frequency signal receiver.

As shown in FIG. 24, in the case when output signal 1080 from local oscillator 1048 exists in segment 1103, if the frequency of oscillator 1048 is increased or decreased by a half height of one segment, output 1080 from oscillator 1048 does not interfere with the segment.

The foregoing control by controller 1076 makes the oscillating frequency supplied from local controller 174 different from those frequencies such as the frequency supplied to the first terminal of antenna switch 1045 (the receiving frequency to the cellular phone), the frequency supplied from power amplifier 1055 (the transmitting frequency from the cellular phone), and the frequency supplied from local oscillator 1048.

Further, those controls are executed only when determiner 45 determines that the bit-error rate exceeds 0.0002. The control current is thus consumed only when the bit-error rate exceeds 0.0002, thereby reducing the power consumption. This advantage is useful for the radio-frequency signal receiver when the receiver is employed in a battery-operated apparatus. In this embodiment, the control current is consumed only when the bit-error rate degrades so that the receiver can operate for longer hours by batteries.

The oscillating frequency of local oscillator 174 is controlled, so that the oscillating frequency of oscillator 174 does not interfere with cellular phone 1042. Therefore, a shielding plate for reinforcing electromagnetic shield between the cellular phone and the portable TV is not needed. As a result, the receiver can be downsized.

An output from local oscillator 1048 or an output from power amplifier 1055 does not interfere with local oscillator 1062. Thus error-increment due to degradation of the C/N of portable TV 1043 does not occur.

In this embodiment, if a local oscillating frequency of a communication apparatus or the radio-frequency signal receiver interfere with the signal sent from the other party, this local oscillating frequency can be changed. In the radio-frequency signal receiver, an output from the local oscillator of the communication apparatus or an output from a mixer of the radio-frequency signal receiver does not interfere with the local oscillator of the receiver. Thus the degradation of the C/N, which increase the bit-error rate, does not occur.

The communication apparatus and the radio-frequency signal receiver are shielded independently; however, there is no need to interpose another shielding plate between the apparatus and the receiver, so that the small-sized apparatus is obtained. The oscillating frequencies of the two local oscillators disposed in the radio-frequency signal receiver do not interfere with an input signal, a power amplifier and the local oscillator of the communication apparatus.

INDUSTRIAL APPLICABILITY

The radio-frequency signal receiver of the present invention includes a determiner for determining whether or not an error rate is higher than a give rate, and a controller, which receives an output from the determiner, for controlling respective sections based on the determination.

The controller controls selectively one of the plural sections for reducing the error rate detected by the determiner, so that the radio-frequency signal receiver having a smaller error rate is obtainable.

When the receiver receives a radio-frequency signal of digital TV broadcasting, a block noise in a video due to degradation of error rate on the receiving signal data is hard to occur. As a result, the reception of broadcasting can produce a quality video.

A floor type TV receiver and its antenna are not moved in general, therefore, a highly sensitive antenna can be installed. The radio-wave received is rather in a stable status, so that the antenna and a tuner are prepared in an optimum condition independently. Therefore, controlling simply a demodulator allows providing the radio-frequency signal receiver having a smaller error rate.

On the other hand, a mobile apparatus or a portable apparatus receives radio-wave changing momentarily when the apparatus is behind a building or in a movement, or depending on a distance from a TV repeater station. The radio-frequency signal receiver of the present invention controls selectively one of the plural sections, thereby dealing with such a situation flexibly and promptly. As a result, the error rate is improved.

The controller of the radio-frequency signal receiver of the present invention controls the respective sections based on the determination done by the determiner whether or not the error rate is higher than the given rate. Thus based on the determination about the error rate, error rates of the overall receiver from the antenna to the demodulator can be improved. There are various factors to degrade the error rates; however, the present invention can improve the error rates.

The invention claimed is:

1. A radio-frequency signal receiver comprising:
   (a) a tuner for receiving a radio-frequency signal;
   (b) a demodulator for receiving an output signal from said tuning section;
   (c) an error corrector for receiving an output signal from said demodulator;
   (d) a determiner for determining whether or not an error rate supplied from said error corrector is higher than a predetermined rate; and
   (e) a controller for controlling, based on the determination by said determiner, a plurality of sections forming the radio-frequency signal receiver,
   wherein said controller selectively controls one of said plurality of sections for reducing the error rate; and
   said plurality of sections are controlled sequentially starting from said error corrector toward an upper stream of a signal-flow.

2. The radio-frequency signal receiver of claim 1, wherein respective times needed until said plurality of sections become stable are stored in advance in a memory, and when the times stored in the memory elapse, said plurality of sections are determined to be in a stable status.

3. The radio-frequency signal receiver of claim 1, wherein when a longest time elapses among respective times needed until said plurality of sections become stable, said plurality of sections are determined to be in a stable status.

4. A radio-frequency signal receiver comprising:
   (a) a tuner for receiving a radio-frequency signal;
   (b) a demodulator for receiving an output signal from said tuning section;
   (c) an error corrector for receiving an output signal from said demodulator;
   (d) a determiner for determining whether or not an error rate supplied from said error corrector is higher than a predetermined rate; and
   (e) a controller for controlling, based on the determination by said determiner, a plurality of sections forming the radio-frequency signal receiver,
   wherein said controller selectively controls one of said plurality of sections for reducing the error rate; and
   said plurality of sections are controlled sequentially in an order of shorter time needed for stabilizing an error rate thereof.

5. The radio-frequency signal receiver of claim 4 further comprising:
   (f) a data comparator;
   (g) a communication apparatus including:
      (g-1) an antenna switch coupled to said antenna;
      (g-2) a first local oscillator;
      (g-3) a first mixer receiving a signal fed into a first terminal of said antenna switch at a first input terminal thereof, and receiving an output from said first local oscillator at a second input terminal thereof;
      (g-4) a second mixer receiving another radio-frequency signal at a first input terminal thereof, and receiving the output from said first local oscillator at a second input terminal thereof, and supplying an output to a second terminal of said antenna switch;
      (g-5) a first PLL circuit controlling an oscillating frequency of said first local oscillator; and
      (g-6) a first data generator coupled to said first PLL circuit and determining a transmitting and receiving frequency,
   said tuner including:
      (a-1) a third mixer receiving a signal fed into another antenna at a first input terminal thereof; and receiving an output from a second local oscillator at a second input terminal thereof;
      (a-2) a band-pass filter receiving an output from said third mixer;
      (a-3) a fourth mixer receiving an output from said band-pass filter at a first input terminal thereof, and receiving an output from a third local oscillator at a second input terminal thereof;
      (a-4) a second PLL circuit controlling an oscillating frequency of the second local oscillator;
      (a-5) a third PLL circuit controlling an oscillating frequency of the third local oscillator; and (a-6) a second data generator coupled to both of said second PLL circuit and said third PLL circuit, wherein said data comparator compares an output data from said first data generator with an output data from said second data generator, and when based on the comparison said controller determines that at least one of said communication apparatus and the radio-frequency signal receiver interfere with the other one, (i) data of said first data generator is changed, and oscillating frequency of said first local oscillator is changed a little; or (ii) data of said second data generator is changed, and the oscillating frequencies of said second and said third local oscillators are changed a little.

6. The radio-frequency signal receiver of claim 5, wherein when said controller determines a difference between an output frequency from said second mixer and the oscillating frequency of said second local oscillator is not more than a predetermined value, said controller changes the respective oscillating frequencies of said second and said third local oscillators a little.

7. The radio-frequency signal receiver of claim 5, wherein when said controller determines a difference between the oscillating frequency of said first local oscillator and the oscillating frequency of said second local oscillator is not more than a predetermined value, said controller changes the respective oscillating frequencies of said second and said third local oscillators a little.

8. The radio-frequency signal receiver of claim 5, wherein when said controller determines a difference between a frequency of an input signal fed into said communication apparatus and the oscillating frequency of said second local oscillator is not more than a predetermined value, said controller changes the respective oscillating frequencies of said second and said third local oscillators a little.

9. The radio-frequency signal receiver of claim 4, wherein when certain plural sections among the plurality of sections are controlled, the control is performed sequentially at each of the plurality of sections on a section by section basis in order of longer time the each of the plurality of sections needs for stabilizing the error rate thereof, and onward sections sequentially in an order of longer time consuming sections for stabilizing their error rates, and said determiner performs the determining after all control signals are sent.

10. The radio-frequency signal receiver of claim 4, wherein respective times needed until said plurality of sections become stable are stored in advance in a memory, and when the times stored in the memory elapse, said plurality of sections are determined to be in the stable status.

11. The radio-frequency signal receiver of claim 4, wherein when a longest time elapses among respective times needed until said plurality of sections become stable, said plurality of sections are determined to be in the stable status.

* * * * *